US006559829B1

(12) United States Patent
Matsuo et al.

(10) Patent No.: US 6,559,829 B1
(45) Date of Patent: May 6, 2003

(54) FLAT DISPLAY DEVICE AND FIXING MEMBER FOR DISPLAY UNIT

(75) Inventors: Youichi Matsuo, Tokyo (JP); Tadami Takehara, Tokyo (JP); Seiji Matsumura, Tokyo (JP); Kan'ichirou Ishibashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/522,074

(22) Filed: Mar. 9, 2000

Related U.S. Application Data

(63) Continuation of application No. PCT/JP98/03099, filed on Jul. 9, 1998.

(51) Int. Cl.[7] ........................... E04G 3/00; F16M 11/12
(52) U.S. Cl. ........................ 345/156; 345/905; 248/918
(58) Field of Search .......................... 248/918; 345/156, 345/905; 361/681, 683

(56) References Cited

U.S. PATENT DOCUMENTS 4,814,759 A * 3/1989 Gombrich et al. .......... 340/771
5,537,290 A * 7/1996 Brown et al. ............... 361/681
6,019,332 A * 2/2000 Sweere et al. ........... 248/284.1

FOREIGN PATENT DOCUMENTS

| | | |
|---|---|---|
| JP | 10143085 | 5/1988 |
| JP | 01273086 | 10/1989 |
| JP | 546184 | 6/1993 |
| JP | 711067 | 2/1995 |
| JP | 7212681 | 8/1995 |
| JP | 09127882 | 5/1997 |
| JP | 09179504 | 7/1997 |
| JP | 09288456 | 11/1997 |

* cited by examiner

*Primary Examiner*—Darren Schuberg
*Assistant Examiner*—Lisa Lea-Edmonds
(74) *Attorney, Agent, or Firm*—Birch, Stewart, Kolasch & Birch, LLP

(57) ABSTRACT

The present invention relates to a structure for installing a flat display device on an installation face. According to a conventional attaching structure, a complicated mechanism is required for a display unit and a fixing member thereof. Therefore, there has been a problem in that the weight and size of the whole device is increased. The flat display device according to the present invention comprises a display unit (1) having a projected portion (11) provided on a predetermined region of a rear face (1R) thereof, a body side fixing member (25) screwed to an upper face (113) of the projected portion (11), and an installation face side fixing member (26) screwed to an installation face (4). A projection (251) provided on an upper side end (25T1) of the body side fixing member (25) is inserted into a cut portion (261) provided on an upper side end (26T1) of the installation face side fixing member (26), and they are supported each other. Thus, the display unit (1) is installed on the installation face (4). Furthermore, the body side fixing member (25) and the installation face side fixing member (26) are fastened and fixed to each other with a screw (7) on both lower side end (25T2, 26T2) sides. The present invention is mainly applied to flat display devices for domestic and commercial use.

18 Claims, 31 Drawing Sheets

FLAT DISPLAY DEVICE AND FIXING MEMBER FOR DISPLAY UNIT

The present application is a continuation of PCT Application PCT/JP98/03099 filed Jul. 9, 1998.

TECHNICAL FIELD

The present invention relates to a structure for installing a flat display device on an installation face.

BACKGROUND ART

First Background Art and Problem Thereof

FIG. 29 is a perspective view schematically showing a structure of flat display device according to a first background (prior art) art disclosed in Japanese Laid-Open Patent Publication No. Hei 1-273086. In FIG. 29, the reference numeral 101 denotes a display unit such as a plasma display device, and the reference numeral 102 denotes a fixing member for hanging and installing the display unit 101 on a wall. The fixing member 102 is constituted by a frame 121, a frame 122, a check plate 123 and a hook fixture 124. As shown in FIG. 29, first of all, ends 1211, 1221, 1212 and 1222 of the frames 121 and 122 and two projected ends 1231 on the upper side of the check plate 123 are inserted and fixed into holes 1115, 1116, 1113, 1114, 1111 and 1112 provided on a rear face of the display unit 101, respectively. Then, a hole 1241 of the hook fixture 124 is hung on a screw fixed to a wall surface or the like. Thus, the display unit 101 is installed on the wall surface. Alternatively, the fixing member 102 is previously fixed to the wall surface with a screw or the like through the hole 1241 of the hook fixture 124, and the display unit 101 is then attached to the fixing member 102 as described above. Consequently, the display unit 101 is installed on the wall surface.

According to the structure in accordance with the first background art, however, the display unit 101 and the fixing member 102 are fixed by simply inserting the ends 1211, 1221, 1212, 1222 and 1231 into the holes 1115, 1116, 1113, 1114, 1111 and 1112 respectively. Therefore, it can be supposed that both the display unit 101 and the fixing member 102 shift or slip down in some cases.

According to the structure in accordance with the first background art, furthermore, the display unit 101 should be fixed onto the wall surface through a work for inserting the four ends 1211, 1221, 1212 and 1222 of the frames 121 and 122 and the two projected ends 1231 on the upper side of the check plate 123 into the fitting holes 1115, 1116, 1113 , 1114, 1111 and 1112, respectively. Therefore, a high dimensional precision is required for the shape of each portion. For this reason, the flat display device according to the first background art has a problem in that a manufacturing cost is increased.

Second Background Art and Problem Thereof

FIGS. 30 and 31 are sectional views schematically showing a structure of a flat display device according to a second background (prior art) art disclosed in Japanese Laid-Open Patent Publication No. Hei 9-127882. FIG. 30 is a longitudinal sectional view showing a state in which a display unit 201 such as a plasma display device is hung and installed on a wall hook 2401 provided on a wall surface 204, and FIG. 31 is an enlarged view showing a part AP enclosed by a broken line portion in FIG. 30. In FIG. 31, the reference numeral 230 denotes an engaging portion. The engaging portion 230 has an opening 230*a*, a notch portion 230*b* and a shaft 230*c*. As shown in FIG. 31, the wall hook 2401 is engaged with the notch portion 230*b* of the engaging portion 230.

The flat display device according to the second background art has a structure capable of changing a configuration of the engaging portion 230, thereby coping with both the case where the display unit 201 is hung and installed on the wall and the case where the display unit 201 is installed as a stationary type. A structure of the engaging portion 230 will be described below with reference to perspective views of FIGS. 32 and 33.

As shown in FIGS. 32 and 33, the shaft 230*c* of the engaging portion 230 is inserted and fitted in a shaft hole 2303 formed on a side face of a concave portion 2301 provided on a rear face of the display unit 201, and the engaging portion 230 has a link mechanism which is rotatable around the shaft 230*c*. In this case, as shown in FIG. 32, the engaging portion 230 is brought down in a direction perpendicular to the rear face of the display unit and a strut which is not shown is inserted and fitted in the opening 230*a* of the engaging portion 230. Thus, the flat display device can be used as the stationary type. On the other hand, in the case where the flat display device is to be hung on a wall for use, the engaging portion 230 is housed in the concave portion 2301 and a stopper 2304 is slid to fix the engaging portion 230 as shown in FIG. 33. As shown in FIG. 31, the notch portion 230*b* of the engaging portion 230 in the above-mentioned state is engaged with the wall hook 2401. Thus, the display unit 201 is installed on the wall surface 204.

According to the structure in accordance with the second background art, however, the above-mentioned link mechanism and a slide mechanism should be provided in the concave portion 2301 on the rear face of the display unit 201. Therefore, a complicated structure having a high dimensional precision is required for the display unit 201 itself. Furthermore, there is also a problem in that a material cost and a manufacturing cost are increased due to such a complicated structure.

As shown in FIG. 31, moreover, the display unit 201 is simply hung on the wall hook. Therefore, there is a possibility that the display unit 201 might slip down.

Third Background Art and Problem Thereof

FIGS. 34 and 35 are side views typically showing a structure of a flat display device according to a third background art (prior art) disclosed in Japanese Laid-Open Patent Publication No. Hei 9-179504.

In the third background art, there has been proposed a structure in which a ceiling suspending fixture 3501 is fixed to a ceiling 306 in the vicinity of a side wall surface 304, one of ends of a suspending wire 3502 having an optional length is connected to the ceiling suspending fixture 3501 and the other end of the suspending wire 3502 is connected to an attachment 350 fixed to a top face of a display unit 301 such as a plasma display device, thereby fixedly suspending the display unit 301 from the ceiling 306 as shown in FIG. 34.

Moreover, the third background art has disclosed a structure in which an eyebolt 340 provided on the top face of the display unit 301 is hung on and engaged with a wall hook 3401 fixed to the side wall surface 304, thereby causing the display unit 301 to face the side wall surface 304 each other with the display unit 301 suspended as shown in FIG. 35.

According to the third background art, however, the display unit 301 is supported in only an upper portion thereof with all the above-mentioned structures. Therefore, the display unit 301 is not directly fixed to the side wall surface 304 and is therefore unstable. For this reason, a flat display device having such a structure has a problem in that the display unit 301 collides with the side wall surface 304 or the support of the suspending wire 3502 easily slips down when an oscillation is applied to the display unit 301 to generate a swing.

According to the structure in accordance with the third background art, moreover, the ceiling suspending fixture 3501, the wire 3502 and the attachment 350 or the wall hook 3401 and the eyebolt 340 are not hidden behind the flat display device or the like but are exposed. Therefore, the shape and dimension of the whole flat display device is correspondingly increased. In addition, there is also a problem in that an installation space is increased.

Fourth Background Art and Problem Thereof

FIGS. 36 to 38 are perspective views schematically showing a structure of a flat display device according to a fourth background (prior art) art disclosed in Japanese Laid-Open Patent Publication No. Hei 9-288456.

First of all, the flat display device having the structure shown in FIG. 36 will be described. In FIG. 36, the reference numeral 4011 denotes a display unit such as a plasma display, the reference numeral 408*a* denotes an attaching portion provided on a wall surface 404, the reference numeral 460 denotes a fixing bar projected from four places on upper and lower faces of the display unit 4011 (the two fixing bars provided on the lower face are not shown), and the reference numeral 4601 denotes a fixing hole for fitting the fixing bar 460 therein.

The flat display device is installed on the wall surface 404 in the following manner. First of all, the display unit 4011 is pushed into the attaching portion 408*a* with the fixing bar 460 previously housed in the display unit 4011. Then, the fixing bar 460 is projected from the display unit 4011 by a predetermined operation, and is fitted in the fixing hole 4601. Consequently, the display unit 4011 is fixed to the attaching portion 408*a*.

Next, the flat display device having the structure shown in FIG. 37 will be described. In FIG. 37, the reference numeral 4012 denotes a display unit such as a plasma display which has a fixing portion 470 provided on an upper face thereof, and the reference numeral 408*b* denotes a mount provided on a wall surface 404. The mount 408*b* has a rotatable handle 4801 provided in an upper portion thereof, and has a groove 4803 provided in a lower portion thereof. According to such a structure, first of all, a lower portion of the display unit 4012 is fitted in the groove 4803, and the handle 4801 is then brought down and hung on the fixing portion 470 of the display unit 4012. Thus, the display unit 4012 is fixed to the mount 408*b*.

Furthermore, the flat display device having the structure shown in FIG. 38 will be described. In FIG. 38, the reference numeral 4013 denotes a display unit such as a plasma display, and the reference numeral 408*c* denotes a mount provided on a wall surface 404. A face of the mount 408*c* which is in contact with the display unit 4013 is provided with a hook hole 4804. According to such a structure, a hook portion (not shown) provided on a rear face of the display unit 4013 is fitted in the hook hole 4804, thereby fixing the display unit 4013 to the mount 408*c*.

The respective flat display devices according to the fourth background art have the above-mentioned structures. Therefore, the portions where the display units 4011, 4012 and 4013 are fitted in the attaching portion 408*a* and the mounts 408*b* and 408*c* corresponding thereto have complicated structures, and a high dimensional precision is required for each portion in order to implement each of the structures. With the structure for installation using the attaching portion 408*a* which is shown in FIG. 36, furthermore, the wall surface 404 should be subjected to a processing. With the structures using the mounts 408*b* and 408*c* which are shown in FIGS. 37 and 38, moreover, a large-sized mount should be prepared separately and a working for providing the mount on a wall surface should be performed. In addition, the fourth background art also includes a problem in that the whole weight of the flat display device is increased due to the above-mentioned complicated structure and the large-sized members.

Fifth Background Art and Problem Thereof

FIGS. 39 and 40 are perspective views schematically showing a structure of a flat display device according to a fifth background art.

According to the structure shown in FIG. 39, first of all, a fixing member 5021 is fixed to a rear face of a display unit 501 with a screw 503, and the fixing member 5021 integrated with the display unit 501 is fixed to a wall surface 504 with a screw 505 through holes provided on right and left ends 5021*a* of the fixing member 5021. It is also possible to suppose such a structure that a fixing member having upper and lower ends is used in place of the right and left ends 5021*a* of the fixing member 5021, thereby screwing the fixing member integrated with the display unit 501 to the wall surface 504 through holes provided on the upper and lower ends.

With the structure shown in FIG. 40, moreover, a display unit 501 and a fixing member 5022 are fastened on a side face 501*a* of the display unit 501. As shown in FIG. 40, first of all, the fixing member 5022 is fixed to the wall surface 504 with a screw 505, and a tapped hole of the side face 501*a* of the display unit 501 is then aligned with a hole provided on the fixing member 5022, thereby fastening both the display unit 501 and the fixing member 5022 with a screw 503. Consequently, the display unit 501 is fixed onto the wall surface 504.

Thus, the flat display device according to the fifth background art has a simpler structure than in the above-mentioned first to fourth background arts.

In the flat display device having the structure shown in FIG. 39, however, positioning for installation on the wall surface 504 should be performed while holding a weight of the display unit 501 integrated with the fixing member 5021, and the display unit 501 and the fixing member 5021 should be fastened with that state kept. Similarly, in the flat display device having the structure shown in FIG. 40, positioning for installation on the fixing member 5022 fixed to the wall surface 504 should previously be performed while holding a weight of the display unit 501, and the display unit 501 and the fixing member 5022 should be fastened with that state kept. Thus, all the structures according to the fifth background art have a problem in that a work for attaching the display unit 501 to the wall surface 504 cannot easily be performed.

Furthermore, at the time of maintenance of the rear face side of the display unit 501, it is necessary to completely remove the display unit 501 from the wall surface 504 or the fixing members 5021 and 5022 in all the structures according to the fifth background art. Therefore, the removing and reattaching works are performed on a large scale.

With all the structures according to the fifth background art, the fixing members 5021 and 5022 are exposed. Therefore, there is also a problem in that a dimension of the whole flat display device is correspondingly increased.

As described above, the flat display devices according to the first to fifth background arts have any of the following problems: (i) A complicated mechanism or shape is required for the display unit, the fixing member or both of them; (ii) A cost of members such as the display unit, the fixing member and the like and a manufacturing cost are increased due to the above-mentioned problem (i); (iii) The weight of the whole flat display device is increased due to the above-mentioned problem (i); (iv) The fixation of the display unit is unstable and fragile regardless of the above-mentioned problem (i); (v) A work for attaching the flat display device or the display unit and a maintenance work thereof cannot easily be performed; or (vi) Since the fixing member is exposed, the dimension of the whole flat display device is correspondingly increased.

DISCLOSURE OF THE INVENTION

In consideration of the above-mentioned problems (i) to (vi), it is a first object of the present invention to provide a flat display device which can realize a reduction in member and manufacturing costs and a decrease in a weight and can implement a sufficient fixing strength by using a simple structure.

Furthermore, it is a second object of the present invention to provide a flat display device in which various workabilities related to the flat display device are enhanced in addition to the achievement of the above-mentioned first object.

Moreover, it is a third object of the present invention to provide a flat display device which can avoid projection of a portion for implementing installation of the flat display device from the flat display device to prevent an increase in a dimension of the whole flat display device, thereby also keeping the appearance of the flat display device in addition to the achievement of the above-mentioned first and second objects.

A first aspect of the present invention is directed to a flat display device comprising a display unit provided with a projected portion on a predetermined region of a rear face thereof, the projected portion having a first side face extended in a first direction, a second side face extended in a second direction orthogonal to the first direction and an upper face defined by the first and second side faces, a body side fixing member fixed onto the upper face of the projected portion, having a first length in the first direction which is greater than a length of the first side face of the projected portion and is smaller than a length in the first direction of the display unit and a second length in the second direction which is smaller than a length in the second direction of the display unit, and an installation face side fixing member having a third length in the first direction which is smaller than the length in the first direction of the display unit and is greater than the length of the first side face of the projected portion and a fourth length in the second direction which is smaller than the length in the second direction of the display unit, the installation face side fixing member including a fixing portion for attaching the installation face side fixing member onto an installation face on which the display unit is to be installed, the body side fixing member including a first support portion provided on a first end corresponding to one of both ends projected from the upper face of the projected portion, the installation face side fixing member including a second support portion provided on an end facing the first end, the first support portion and the second support portion being supported each other, and the body side fixing member and the installation face side fixing member being fixed to the upper face of the projected portion and the installation face, respectively, so as not to protrude from an outer frame of the display unit as seen from a front face side of the display unit.

According to the flat display device in accordance with the first aspect of the present invention, the body side fixing member has such a dimension that the first length is greater than the length of the first side face of the projected portion and is smaller than the length in the first direction of the display unit and the second length is smaller than the length in the second direction of the display unit. On the other hand, the third length of the installation face side fixing member is smaller than the length in the first direction of the display unit and is greater than the length of the first side face of the projected portion, and the fourth length is smaller than the length in the second direction of the display unit. In addition, the body side fixing member and the installation face side fixing member are fixed to the upper face of the projected portion and the installation face such that it does not protrude from the outer frame of the display unit as seen from the front face side of the display unit, respectively.

Accordingly, all the fixing members are housed in the rear face side of the display unit. Therefore, each fixing member can be seen with difficulty and the dimension or installation space of the whole flat display device can be reduced correspondingly.

In addition, the display unit with the body side fixing member fixed thereto can be installed on the installation face by supporting the first support portion of the body side fixing member and the second end of the installation face side fixing member each other. Consequently, there is also an advantage that the display unit can easily be attached to the installation face.

A second aspect of the present invention is directed to the flat display device according to the first aspect of the present invention, wherein the first and second support portions have the first support portion rotatably supported at a rotating angle in a plane defined by a third direction orthogonal to the first and second directions and the first direction.

According to the flat display device in accordance with the second aspect of the present invention, after the display unit is installed on the installation face, the body side fixing member can be rotated to be tilted with respect to the installation face side fixing member. Accordingly, it is possible to perform various works such as a maintenance work and the like by utilizing a space generated between the both fixing members due to the rotation.

A third aspect of the present invention is directed to the flat display device according to the second aspect of the present invention, wherein a mechanism to which a member for supporting the first support portion can be attached such that the body side fixing member is tilted at a predetermined angle with respect to the installation face side fixing member is provided on both a second end corresponding to the other end of the both ends of the body side fixing member and an end of the installation face side fixing member facing the second end.

According to the flat display device in accordance with the third aspect of the present invention, after the display unit is installed on the installation face by the mutual support between the body side fixing member and the installation face side fixing member, the display unit is tilted up to a predetermined angle with respect to the installation face so that the tilt state can be held. In this case, a constant space is stably formed and held between the body side fixing member and the installation face side fixing member. Therefore, also after the display unit is provided on the installation face, a work for connecting a cable to a connector provided on the rear face of the display unit, a maintenance work for the display unit and the like can be performed more easily and reliably. According to the flat display device, therefore, it is possible to provide a flat display device capable of enhancing various workabilities related to the device still more.

Furthermore, in the case where the display unit is tilted and the tilt state is held when using the flat display device, visibility of the flat display device can also be enhanced.

A fourth aspect of the present invention is directed to the flat display device according to the second aspect of the present invention, wherein a rotary damper having a rotary shaft constituting the first support portion is provided on the first end of the body side fixing member, and the rotary shaft and the second support portion are supported each other.

According to the flat display device in accordance with the fourth aspect of the present invention, it is possible to obtain the same effects as the effects according to the second aspect.

A fifth aspect of the present invention is directed to the flat display device according to the first aspect of the present invention, wherein the first support portion includes first and second projections extended in directions opposite to each other from the first end in the second direction, the second support portion includes first and second cut portions formed to face each other on a third end facing the first end in the first direction, the first projection is inserted in the first cut portion, and the second projection is inserted in the second cut portion.

According to the flat display device in accordance with the fifth aspect of the present invention, the display unit can surely be provided on the installation face by simply inserting the corresponding projection on the first end of the body side fixing member fixed to the display unit into each cut portion on the third end of the installation face side fixing member which is previously fixed to a predetermined position on the installation face. According to the fifth aspect of the present invention, therefore, a worker can completely install the display unit on the installation face at one touch. Therefore, it is possible to provide a flat display device in which a workability is enhanced dramatically.

A sixth aspect of the present invention is directed to the flat display device according to the fifth aspect of the present invention, wherein the first and second projections are inserted with a play in the first and second cut portions, respectively.

According to the flat display device in accordance with the sixth aspect of the present invention, the first and second projections are inserted with a play in the first and second cut portions, respectively. Therefore, the display unit can be rotated by using the projection as a central axis in the second direction in which the projection is extended. According to the sixth aspect of the present invention, therefore, the body side fixing member can be rotated to be tilted with respect to the installation face side fixing member after the display unit is installed on the installation face. Accordingly, various works such as a maintenance work and the like can be performed by utilizing a space generated between the both fixing members due to the rotation.

A seventh aspect of the present invention is directed to the flat display device according to the sixth aspect of the present invention, wherein the body side fixing member further includes a first hole portion provided on a second end which is the other end of the both ends, and the installation face side fixing member further includes a second hole portion provided on a fourth end facing the second end, the first and second hole portions being formed in positions where corresponding tips of a bar processed to have predetermined shapes for tilting the body side fixing member at a predetermined angle with respect to the installation face side fixing member can be inserted, respectively.

According to the flat display device in accordance with the seventh aspect of the present invention, in the case where the corresponding tips of the bar are inserted into the first and second hole portions respectively, it is possible to hold a state in which the body side fixing member or the display unit is tilted at the predetermined angle (tilt angle) with respect to the installation face side fixing member.

Therefore, a constant space is stably formed and held between the body side fixing member and the installation face side fixing member. Therefore, also after the display unit is provided on the installation face, a work for connecting a cable to a connector provided on the rear face of the display unit, a maintenance work for the display unit and the like can be performed more easily and reliably. According to the flat display device, therefore, it is possible to provide a flat display device capable of enhancing various workabilities related to the device still more.

Furthermore, in the case where the display unit is tilted and the tilt state is held when using the flat display device, visibility of the flat display device can also be enhanced.

An eighth aspect of the present invention is directed to the flat display device according to the first aspect of the present invention, wherein the body side fixing member includes a first fixing portion provided in the second end corresponding to the other end of the both ends, and the installation face side fixing member includes a second fixing portion provided in an end facing the second end corresponding to a position where the first fixing portion is to be provided, the first and second fixing portions being fixed to each other through a fixing member.

According to the flat display device in accordance with the eighth aspect of the present invention, the first and second fixing portions are fixed to each other through the fixing member. Therefore, the body side fixing member and the installation face side fixing member can firmly be fixed to each other by the support of the first and second support potions and the fixation of the fixing member. In addition, the body side fixing member is fixed onto the projected portion of the display unit, and the installation face side fixing member is fixed onto the installation face. Therefore, the flat display device or the display unit can firmly be fixed onto the installation face.

A ninth aspect of the present invention is directed to the flat display device according to the eighth aspect of the present invention, wherein the fixing member is a screw, the first and second fixing portions are fastened to each other with the screw, and the screw does not protrude from the outer frame of the display unit.

According to the flat display device in accordance with the ninth aspect of the present invention, the first and second fixing portions are fastened to each other with the screw. Therefore, it is possible to obtain the same effects as the effects according to the eighth aspect.

According to the ninth aspect of the present invention, furthermore, the screw does not protrude from the outer frame of the display unit. Therefore, it is possible to prevent the attaching member from protruding from the outer frame of the flat display device.

A tenth aspect of the present invention is directed to the flat display device according to the ninth aspect of the present invention, wherein the first fixing portion includes a first plate-shaped portion tilted at a predetermined angle with respect to the installation face, and the second fixing portion includes a second plate-shaped portion tilted at the predetermined angle with respect to the installation face, the first and second plate-shaped portions being formed in positions where they are in surface-to-surface contact with each other and being fastened to each other with the screw.

According to the flat display device in accordance with the tenth aspect of the present invention, there is an advantage that the work for fastening the body side fixing member to the installation face side fixing member can be performed, for example, in an obliquely forward direction of the flat display device or obliquely below the flat display device by properly setting the predetermined angle of the first and second plate-shaped portions to the installation face. In particular, this advantage can be obtained remarkably when the installation face is a wall surface where a screwing work cannot easily be performed in a transverse direction.

An eleventh aspect of the present invention is directed to the flat display device according to the eighth aspect of the present invention, wherein the body side fixing member further includes a first plate-shaped portion which is parallel with a plane defined by the first direction and a third direction orthogonal to the first and second directions, an end of the first plate-shaped portion forming a part of the second end corresponding to the first fixing portion, and the installation face side fixing member further includes a second plate-shaped portion which is parallel with the first plate-shaped portion, an end of the second plate-shaped portion forming a part of the end facing the second end corresponding to the second fixing portion, the first and second plate-shaped portions being formed in positions where they are in surface-to-surface contact with each other.

According to the flat display device in accordance with the eleventh aspect of the present invention, there is an advantage that the work for fastening the body side fixing member to the installation face side fixing member can be obtained from the side of the flat display device.

A twelfth aspect of the present invention is directed to the flat display device according to the first aspect of the present invention, wherein a space between one of side faces which is perpendicular to the first direction of the display unit and one of the first side faces of the projected portion on a side where the first end and a third end of the installation face side fixing member facing the first end are projected is greater than a length in the first direction of each of the first end and the third end, and a space between the other side face which is perpendicular to the first direction of the display unit and the other face of the first side faces of the projected portion on a side where a second end corresponding to the other end of the both ends of the body side fixing member and a fourth end of the installation face side fixing member facing the second end are projected is greater than a length in the first direction of each of the second end and the fourth end.

According to the flat display device in accordance with the twelfth aspect of the present invention, the distance in the first direction from the first side face of the projected portion to the side face perpendicular to the first direction on the display unit side where the first end and the third end are projected is greater than the length in the first direction of each of the first end and the third end. Moreover, the distance in the first direction from the first side face of the projected portion to the side face perpendicular to the first direction on the display unit side where the second and fourth ends of the body side fixing member are projected is greater than the length in the first direction of each of the second end and the fourth end. Consequently, the body side fixing member and the installation face side fixing member do not protrude from the outer frame of the display unit as seen from the front face side of the display unit, respectively. Therefore, each fixing member can be seen with difficulty and the dimension or installation space of the whole flat display device can be reduced.

A thirteenth aspect of the present invention is directed to the flat display device according to the first aspect of the present invention, wherein the body side fixing member is constituted by first and second body side fixing members having shapes symmetrical with each other, the first body side fixing member being fixed to an end of the upper face along one side face side in the first side face of the projected portion, and the second body side fixing member being fixed to an end of the upper face along the other side face side in the first side face of the projected portion.

According to the flat display device in accordance with the thirteenth aspect of the present invention, the body side fixing member includes two members, that is, the first and second body side fixing members. Therefore, the weight of the body side fixing member itself can be reduced. As a result, the weight of the whole flat display device can be reduced.

A fourteenth aspect of the present invention is directed to the flat display device according to the thirteenth aspect of the present invention, wherein the first body side fixing member further includes a first plate-shaped portion which is parallel with one of the side faces and overlaps the side face, and the second body side fixing member further includes a second plate-shaped portion which is parallel with the other side face and overlaps the other side face, a length in the third direction of each of the first and second plate-shaped portions being set based on a distance between the upper face of the projected portion and the rear face of the display unit.

According to the flat display device in accordance with the fourteenth aspect of the present invention, the length in the third direction of each of the first and second plate-shaped portions, that is, the length in the third direction of the body side fixing member can mostly or partially be absorbed in the distance between the upper face of the projected portion and the rear face of the display unit. Accordingly, it is possible to control the amount of the protrusion of the flat display device from the installation face. Therefore, it is possible to provide an attaching structure of the flat display device which exactly makes the most of the features of a thin flat display device.

A fifteenth aspect of the present invention is directed to the flat display device according to the fourteenth aspect of the present invention, wherein the first installation face side fixing member further includes a third plate-shaped portion which is parallel with one of the side faces and overlaps the side face and the first plate-shaped portion, and the second installation face side fixing member further includes a fourth plate-shaped portion which is parallel with the other side face and overlaps the other side face and the second plate-shaped portion, a length in the third direction of each of the third and fourth plate-shaped portions being set based on the distance between the upper face of the projected portion and the rear face of the display unit.

According to the flat display device in accordance with the fifteenth aspect of the present invention, the length in the third direction of each of the second and fourth plate-shaped portions, that is, the length in the third direction of the installation face side fixing member can mostly or partially be absorbed in the distance between the upper face of the projected portion and the rear face of the display unit. Accordingly, it is possible to obtain the same effects as the effects according to the fourteenth aspect described above.

A sixteenth aspect of the present invention is directed to the flat display device according to the first aspect of the present invention, wherein the installation face side fixing member includes the first and second installation face side fixing members which are parallel with each other, are provided in the first direction and have shapes symmetrical with each other, and the first and second positioning members which are connected to both of the first and second installation face side fixing members and are provided in the second direction.

According to the flat display device in accordance with the sixteenth aspect of the present invention, the installation face side fixing member is constituted by four members including the first and second installation face side fixing members and the first and second positioning members. Therefore, the weight of the installation face side fixing member itself can be more reduced than in the structure obtained by the installation face side fixing member itself with one large member. As a result, it is possible to reduce the weight of the whole flat display device.

A first aspect of the present invention is directed to a fixing member for a display unit for installing, on an installation face, a display unit provided with a projected portion on a predetermined region of a rear face thereof, the projected portion having a first side face extended in a first direction, a second side face extended in a second direction orthogonal to the first direction and an upper face defined by the first and second side faces, wherein a first length in the first direction is greater than a length of the first side face of the projected portion and is smaller than a length in the first direction of the display unit and a second length in the second direction is smaller than a length in the second direction of the display unit, the fixing member can be fixed onto the upper face of the projected portion such that it does not protrude from an outer frame of the display unit as seen from a front face side of the display unit, and a projection extended in the second direction is provided on one of both ends projected from the upper face of the projected portion.

According to the fixing member for a display unit in accordance with the first aspect of the present invention, the fixing member does not protrude from the outer frame of the display unit as seen from the front face side of the display unit. Thus, it is possible to provide an attaching structure of the flat display device which can produce the effects according to the flat display device in accordance with the first aspect of the present invention.

A second aspect of the present invention is directed to a fixing member for a display unit for installing, on an installation face, a display unit provided with a projected portion on a predetermined region of a rear face thereof, the projected portion having a first side face extended in a first direction, a second side face extended in a second direction orthogonal to the first direction and an upper face defined by the first and second side faces, the fixing member having a length in the first direction which is smaller than the length in the first direction of the display unit and is greater than the length of the first side face of the projected portion and a fourth length in the second direction which is smaller than the length in the second direction of the display unit, the fixing member comprising a fixing portion for attaching the fixing member onto an installation face where the display unit is to be installed such that it does not protrude from an outer frame of the display unit as seen from a front face side of the display unit, and a cut portion is formed in the first direction on one of both ends in the first direction.

According to the fixing member for a display unit in accordance with the second aspect of the present invention, the fixing member does not protrude from the outer frame of the display unit as seen from the front face side of the display unit. Thus, it is possible to provide an attaching structure of the flat display device which can produce the effects according to the flat display device in accordance with the first aspect of the present invention.

The objects, features, aspects and advantages of the present invention will become more apparent from the following detailed description and the accompanying drawings.

BEST MODE FOR CARRYING OUT THE INVENTION

First Embodiment

Figure 1:
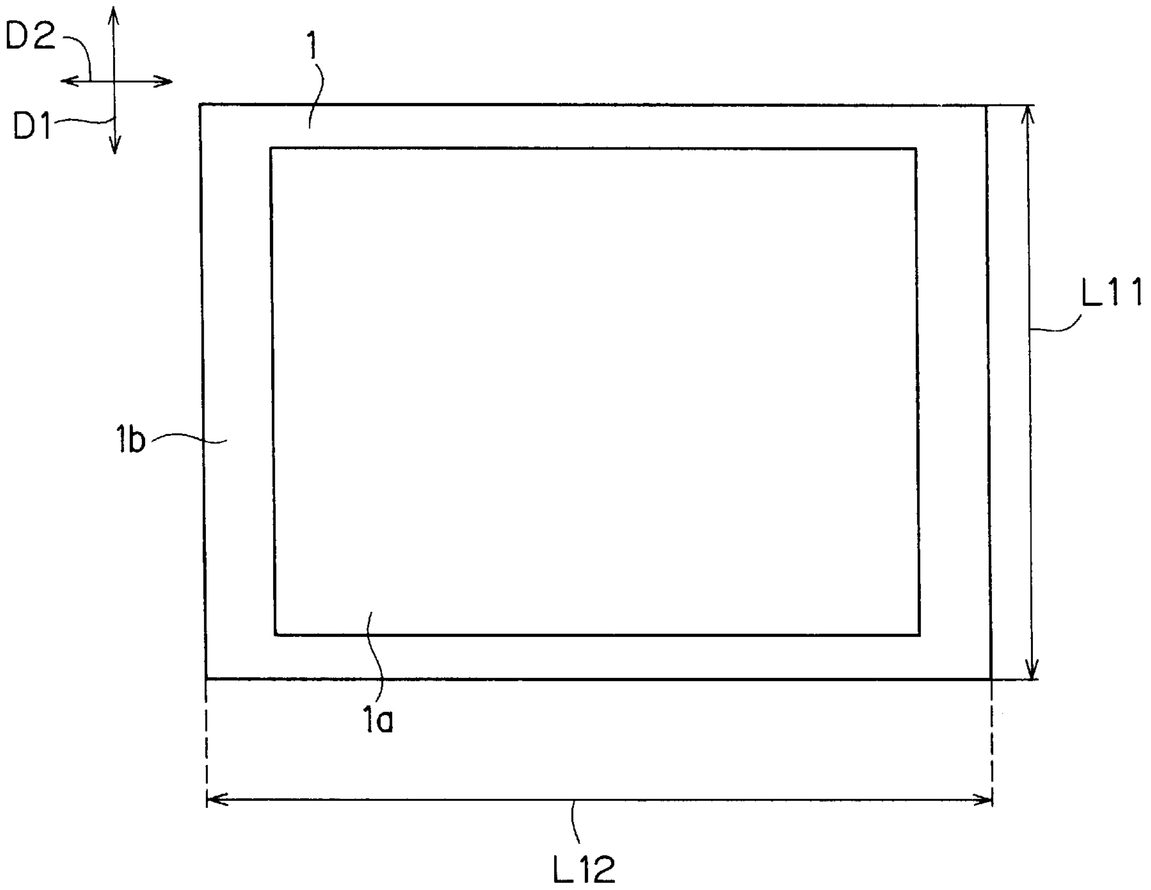
FIG. 1 is a front view showing a structure of a flat display device according to a first embodiment.
Figure 2:
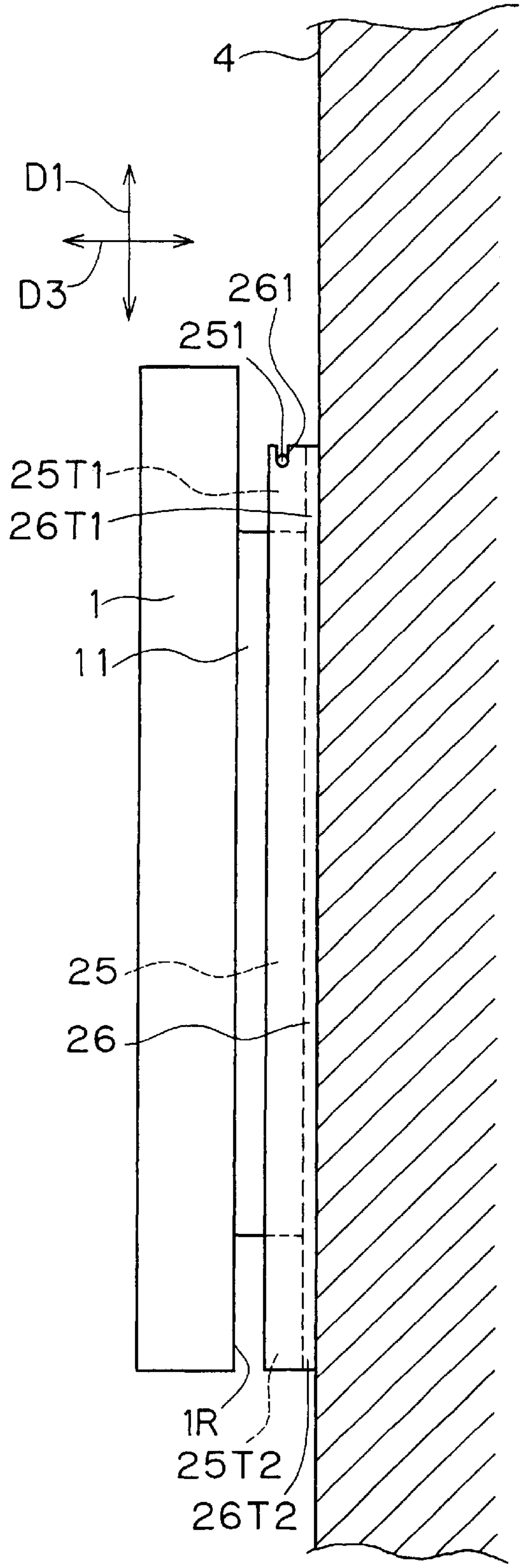
FIG. 2 is a side view showing the structure of the flat display device and an installation configuration thereof according to the first embodiment.

FIG. 1 is a front view showing a flat display device according to a first embodiment, and FIG. 2 is a side view showing the flat display device. As shown in FIGS. 1 and 2, the flat display device comprises a display unit 1 having en external shape formed by a flat display panel 1*a* (for example, a plasma display panel) and a housing 1*b*, a body side fixing member 25 shown in a broken line which is fixed onto a projected portion 11 provided on a predetermined region of a rear face 1R of the display unit 1, and an installation face side fixing member 26 fixed onto an installation face 4 (for example, a wall surface), and can be installed on the installation face 4 by mutually supporting a first support portion 251 provided on an upper side end (a first end) 25T1 of the body side fixing member 25 and a second support portion 261 provided on an upper side end (a third end) 26T1 of the installation face side fixing member 26.

In the following explanation, the detailed structures of the display unit 1, the body side fixing member 25 and the installation face side fixing member 26 will be described to make features of the flat display device clear.

(Display Unit 1)

Figure 3:
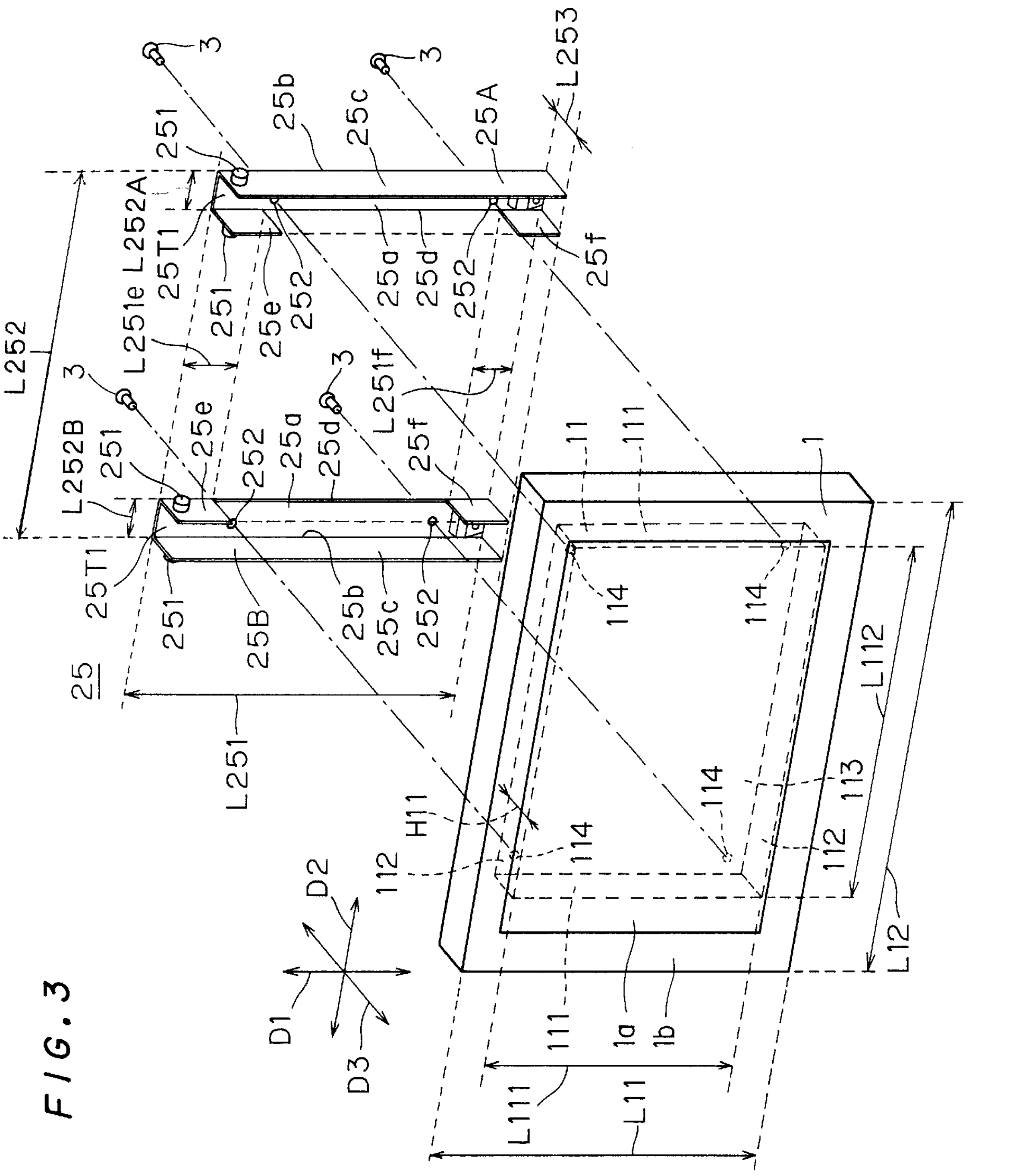
FIG. 3 is a perspective view showing structures of a display unit and a body side fixing member and an assembly configuration for both of them.
Figure 4:
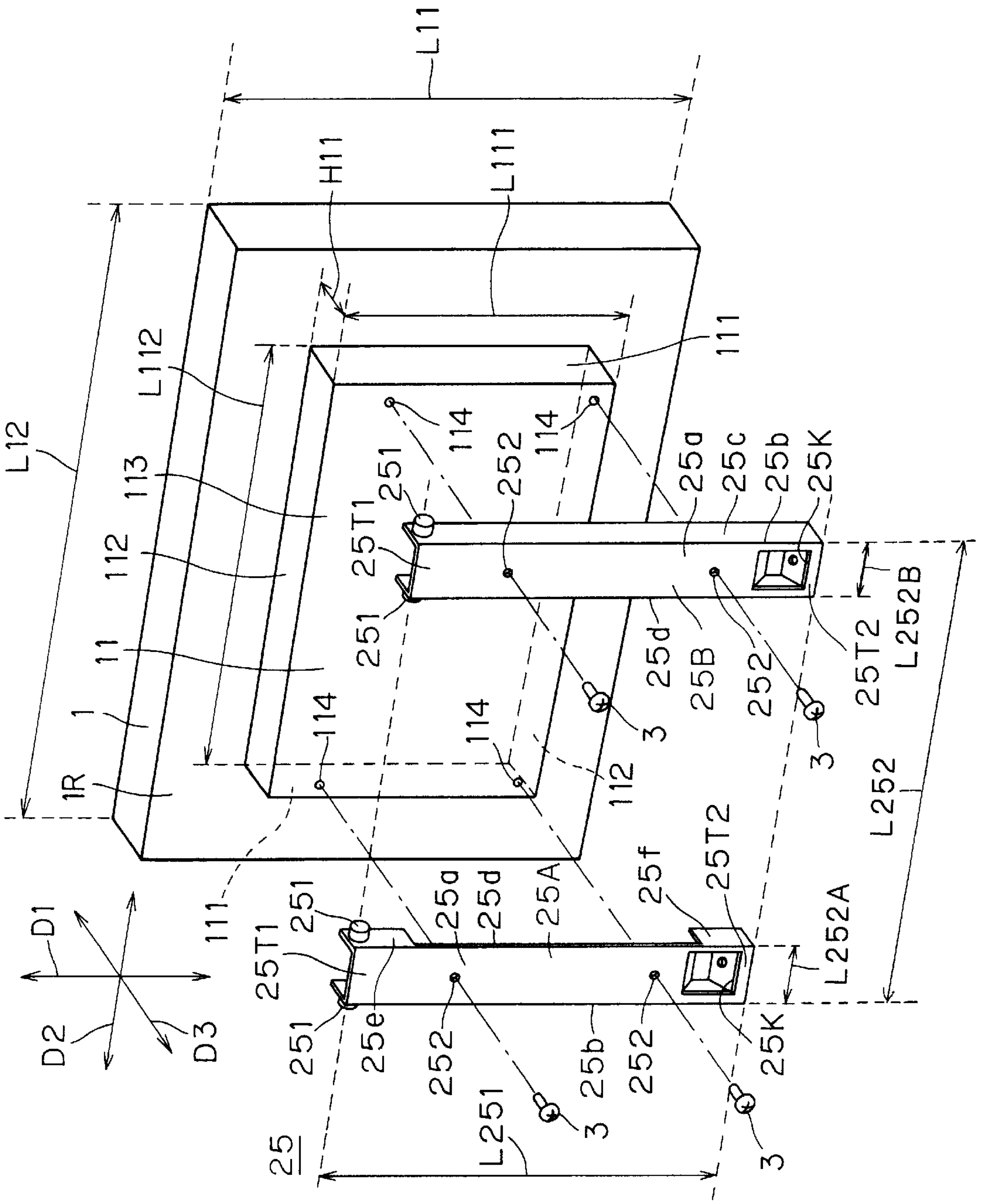
FIG. 4 is a perspective view showing the structures of the display unit and the body side fixing member and the assembly configuration for both of them.

FIGS. 3 and 4 are perspective views showing the structures of the display unit 1 and the body side fixing member 25 and a mutual assembly configuration (fixing configuration) thereof. FIG. 3 is a perspective view showing the display unit 1 seen from a front face side, and FIG. 4 is a perspective view showing the display unit 1 seen from a rear face side.

The appearance of the display unit 1 includes a flat display panel 1*a* and a box-shaped housing 1*b* surrounding the flat display panel 1*a* as shown in FIG. 1. On a front face of the housing 1*b* is formed an opening (not shown) having a shape corresponding to the flat display panel 1*a* and serving to expose a display face of the flat display panel 1*a* provided in the housing 1*b* in contact with the front face. Various flat display panels such as a plasma display panel, a liquid crystal panel and the like are used as the flat display panel 1*a*.

As shown in FIGS. 3 and 4, the projected portion 11 having a first side face 111 parallel with a first direction D1, a second side face 112 parallel with a second direction D2 which is orthogonal to the first direction D1 and an upper face 113 defined by the first side face 111 and the second side face 112 is provided on the predetermined region of the rear face 1R of the display unit 1. The projected portion 11 has a height H11 given as a distance between the rear face 1R of the display unit 1 and the upper face 113 of the projected portion 11.

Furthermore, four tapped holes 114 for screwing and fixing the body side fixing member 25 which will be described below are provided in predetermined positions on four corners of the upper face 113 of the projected portion 11.

(Body Side Fixing Member 25)

Next, a structure of the body side fixing member 25 will be described with reference to FIGS. 3 and 4.

The body side fixing member 25 is formed by two separate members having shapes symmetrical with each other, that is, first and second body side fixing members (which will be hereinafter referred to as "a first body side fixing member 25A" and "a second body side fixing member 25B"). Each of the first and second body side fixing members 25A and 25B is fixed in the vicinity of an end on the second direction D2 side of the upper face 113 of the projected portion 11 in such a manner that the first side face 111 of the corresponding projected portion 11 is covered from the upper face 113 side and the both ends 25T1 and 25T2 on the first direction D1 side protrude from the upper face 113. For this reason, each of the first and second body side fixing members 25A and 25B includes, as a base member, a plate-shaped portion 25*a* including a rectangular main surface and section (which will also be referred to as "a base member 25*a*") having a first length L251 in the first direction D1 and second lengths L252A and L252B (L252A=L252B) in the second direction D2. In particular, the first length L251 is greater than a length L111 of the first side face 111 of the projected portion 11 and is smaller than a length L11 in the first direction D1 of the display unit 1, and the second lengths L252A and L252B are smaller than a length L12 in the second direction D2 of the display unit 1 and are smaller than a length L112 in the second direction D2 of the projected portion in the first embodiment. In particular, a length in the second direction D2 of the body side fixing member 25, that is, a distance L252 between longer side portions 25*b* of both base members 25*a* is smaller than the length L12 in the second direction D2 of the display unit 1 and is slightly greater than (almost equal to) the length L112 in the second direction D2 of the projected portion in the first embodiment. For this reason, the length L252 can be regarded as "a second dimension of the body side fixing member" when the functions of the first and second body side fixing members 25A and 25B fixed to the projected portion 11 are integrated.

Furthermore, each of the first and second body side fixing members 25A and 25B has a plate-shaped portion 25*c* having a rectangular main surface and section which is extended in a third direction D3 orthogonal to the first direction D1 and the second direction D2 from one of the longer side portions 25*b* in the first direction D1 of the plate-shaped portion 25*a*. A length in the first direction D1 of the plate-shaped portion 25*c* is set equal to the first length L251, and a length L253 in the third direction D3 of the plate-shaped portion 25*c* is set equal to or smaller than the height H11 of the projected portion 11.

Moreover, each of the body side fixing members 25A and 25B has plate-shaped portions 25*e* and 25*f* having rectangular main surfaces and sections which are extended in the third direction D3 from respective portions on upper and lower side end (first and second end) 25T1 and 25T2 sides apart from each other by at least a distance corresponding to the length L111 in the first direction D1 of the projected portion 11 in the other longer side portion 25*d* in the first direction D1 of the plate-shaped portion 25*a*. Such plate-shaped portions 25*e* and 25*f* have lengths L251*e* and L251*f* in the first direction D1, and the length L253 in the third direction D3 which is equal to or smaller than the height H11 of the projected portion 11. The lengths L251*e* and L251*f* are almost equal to each other, and are almost equal to a half of a difference between the first length L251 of the plate-shaped portion 25*a* and the length L111 in the first direction D1 of the projected portion 11.

As is apparent from the above description and FIGS. 3 and 4, the respective lengths L251 and L252 can be regarded as lengths in the first and second directions D1 and D2 of the body side fixing member 25 (25A, 25B), respectively. Similarly, the upper and lower side ends (first and second ends) 25T1 and 25T2 of the base member 25*a* may be referred to as upper and lower side ends (first and second ends) of the body side fixing member 25 (25A, 25B), respectively.

The above-mentioned structures of the first and second body side fixing members 25A and 25B can be formed by preparing a long member having a U-shaped section seen in the first direction D1, cutting the long member into a member having the length L251, and then performing cutting and removal leaving portions (corresponding to the plate-shaped portions 25*e* and 25*f*) given within a range of the lengths L251*e* and L251*f* from both ends in a longitudinal direction (first direction D1) of one of planes facing each other with respect to the second direction D2 of the long member.

Accordingly, in the case where the structure of the body side fixing member 25 is seen by such a forming method, the first and second body side fixing members 25A and 25B have such a structure as to remove portions other than the portions (corresponding to the plate-shaped portions 25*e* and 25*f*) given within the range of the lengths L251*e* and L251*f* from both ends in the longitudinal direction (first direction D1) in one of the facing planes of the long member having a U-shaped section seen in the longitudinal direction and having the length L251. In the U-shaped section, it can also be understood that dimensions of two opposed sides (that is, lengths in the third direction D3 of the plate-shaped portions 25*c*, 25*e* and 25*f*) have a length L253 and a dimension of a side having the two sides on both ends thereof (that is, a length in the second direction D2 of the base member 25*a*) has lengths L252A and L252B.

Furthermore, the first body side fixing member 25A has a columnar or cylindrical projection (corresponding to a first projection) 251 extended in a direction perpendicular to surfaces on the opposite side of the surfaces of the plate-shaped portions 25*c* and 25*e* facing each other (which will be hereinafter referred to as "outer surfaces"), that is, in reverse directions to each other along the second direction D2 over the outer surfaces. Both or either of the two projections 251 form(s) the first support portion provided on the first end 25T1 of the first body side fixing member 25A. In detail, each of the projections 251 is provided such that an outer edge of the projection 251 internally comes in contact with a side in the third direction D3 on the upper side end (first end) 25T1 side of each of the plate-shaped portions 25*c* and 25*e* as shown in a side view of FIG. 10 and a top view of FIG. 11 which will be described below.

Similarly, the second body side fixing member 25B also has projections (second projections) 251 extended in opposite directions to the second direction D2, and both or either of the projections 251 form(s) the first support portion provided on the upper side end (first end) 25T1 of the second body side fixing member 25B.

As shown in FIG. 4, moreover, each of the first and second body side fixing members 25A and 25B forming shapes symmetrical with each other has two tapped holes 252 provided in each of the base members 25*a* in such a manner that a central axis of each tapped hole 114 provided on the upper face 113 corresponds to a central axis of the tapped hole 252 when the body side fixing members 25A and 25B are to be fixed to the projected portion 11 by causing a surface (a back face) of the base member 25*a* to come in contact with the upper face 113 of the projected portion 11 and causing a surface (a back face) facing each of the plate-shaped portions 25*e* and 25*f* of the projected plate-shaped portion 25*c* in the third direction D3 to come in contact with the first side face 111 of the projected portion 11.

Figure 5:
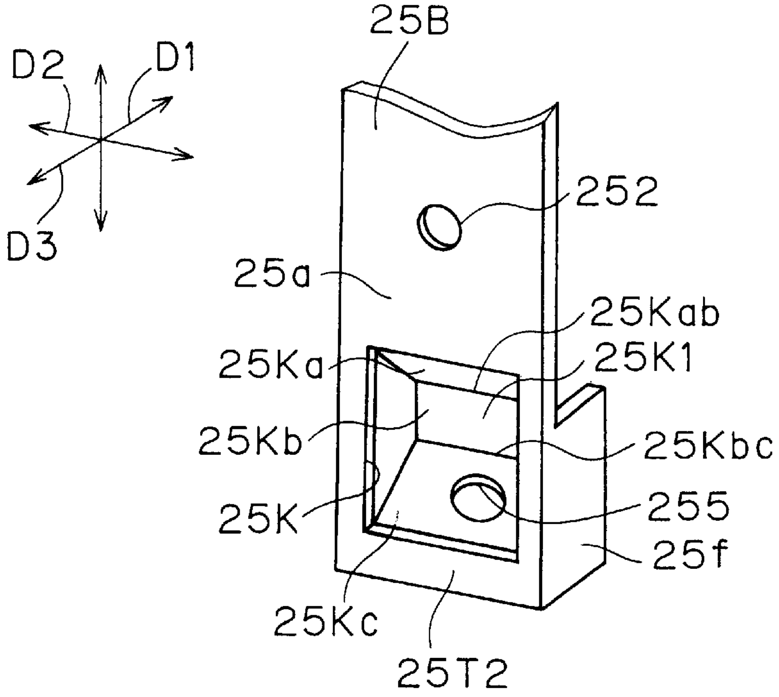
FIG. 5 is an enlarged perspective view showing a structure of a lower side end of the body side fixing member according to the first embodiment.
Figure 6:
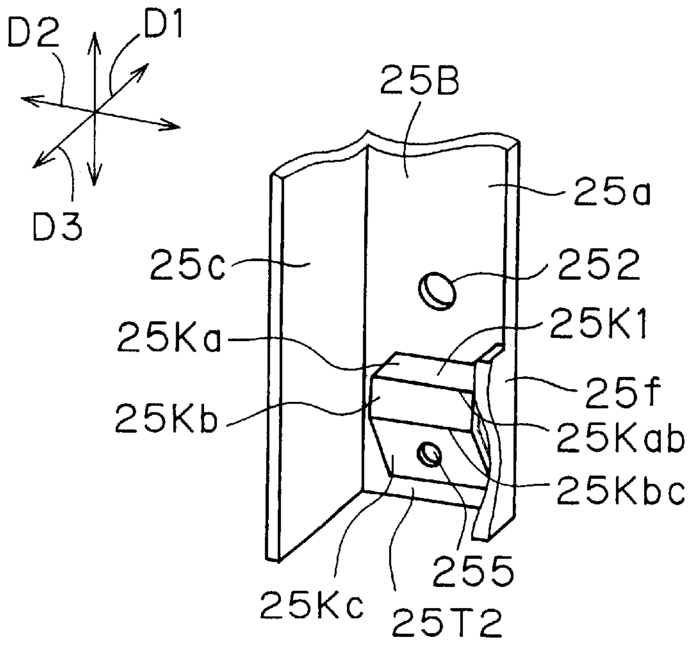
FIG. 6 is an enlarged perspective view showing the structure of the lower side end of the body side fixing member according to the first embodiment.

Next, a structure on the lower side end (second end) 25T2 side of each of the first and second body side fixing members 25A and 25B will be described with reference to FIGS. 5 and 6 in which the vicinity of such a portion is enlarged. While FIGS. 5 and 6 show the second body side fixing member 25B illustrated in FIGS. 3 and 4, the following description can also be applied to the first body side fixing member 25A as a matter of course. FIG. 5 is a view showing the portion seen in the same direction as in FIG. 4, and FIG. 6 is a view showing the portion seen in the same direction as in FIG. 3. For convenience of the description, a part of the plate-shaped portion 25*f* is taken away in FIG. 6.

As shown in FIGS. 5 and 6, the lower side end (second end) 25T2 of the second body side fixing member 25B has a mechanism for fixedly coupling the lower side end 25T2 to a facing lower side end (a fourth end) 26T2 of the installation face side fixing member 26. More specifically, an opening 25K is provided in a predetermined position on the lower side end (second end) 25T2 side of the plate-shaped portion 25*a*. A hood-shaped member (first fixing portion) 25K1 having a trapezoidal section which is formed by sequentially coupling three plate-shaped portions 25K*a*, 25K*b* and 25K*c* (first plate-shaped portions) is provided on a surface of the second body side fixing member 25B in such a manner that it is projected from the opening 25K toward the inside, that is, toward the rear face 1R side of the display unit 1. In detail, the member 25K1 has a structure in which each of two sides in the second direction D2 of the plate-shaped portion 25K*b* is connected to one of sides in the second direction D2 of each of the plate-shaped portions 25K*a* and 25K*c* to form edges 25K*ab* and 25K*bc*, the other side in the second direction D2 of the plate-shaped portion 25K*a* is connected to a side in the second direction D2 of the opening 25K on the upper side end (first end) 25T1 side (for example, see FIG. 3), and the other side in the second direction D2 of the plate-shaped portion 25K*c* is connected to a side in the second direction D2 of the opening 25K facing an edge of the lower side end (second end) 25T2. In this case, the plate-shaped portion 25K*b* is provided in parallel with the base member 25*a* as shown in a side view (a sectional view) of FIG. 16 which will be described below.

As shown in the side view (the sectional view) of FIG. 16 which will be described below, furthermore, the plate-shaped portion 25K*c* is provided with angle regulation such that a plane thereof can come in contact with a plane of the plate-shaped portion 26K*c* of the installation face side fixing member 26 which will be described below when the display unit 1 is installed on the installation face 4. In addition, the plate-shaped portion 25K*c* has a hole portion 255 for fixing a lower part in a position where a central axis of the hole portion 255 for fixing a lower part is coincident with a central axis of a tapped hole 265 for fixing a lower part provided on the plate-shaped portion 26K*c* which will be described below in a state in which a plane of the plate-shaped portion 25K*c* is in contact with that of the plate-shaped portion 26K*c* which will be described below.

(Structure of Installation Face Side Fixing Member 26)

Next, a structure of the installation face side fixing member 26 will be described with reference to FIGS. 7 to 9.

Figure 7:
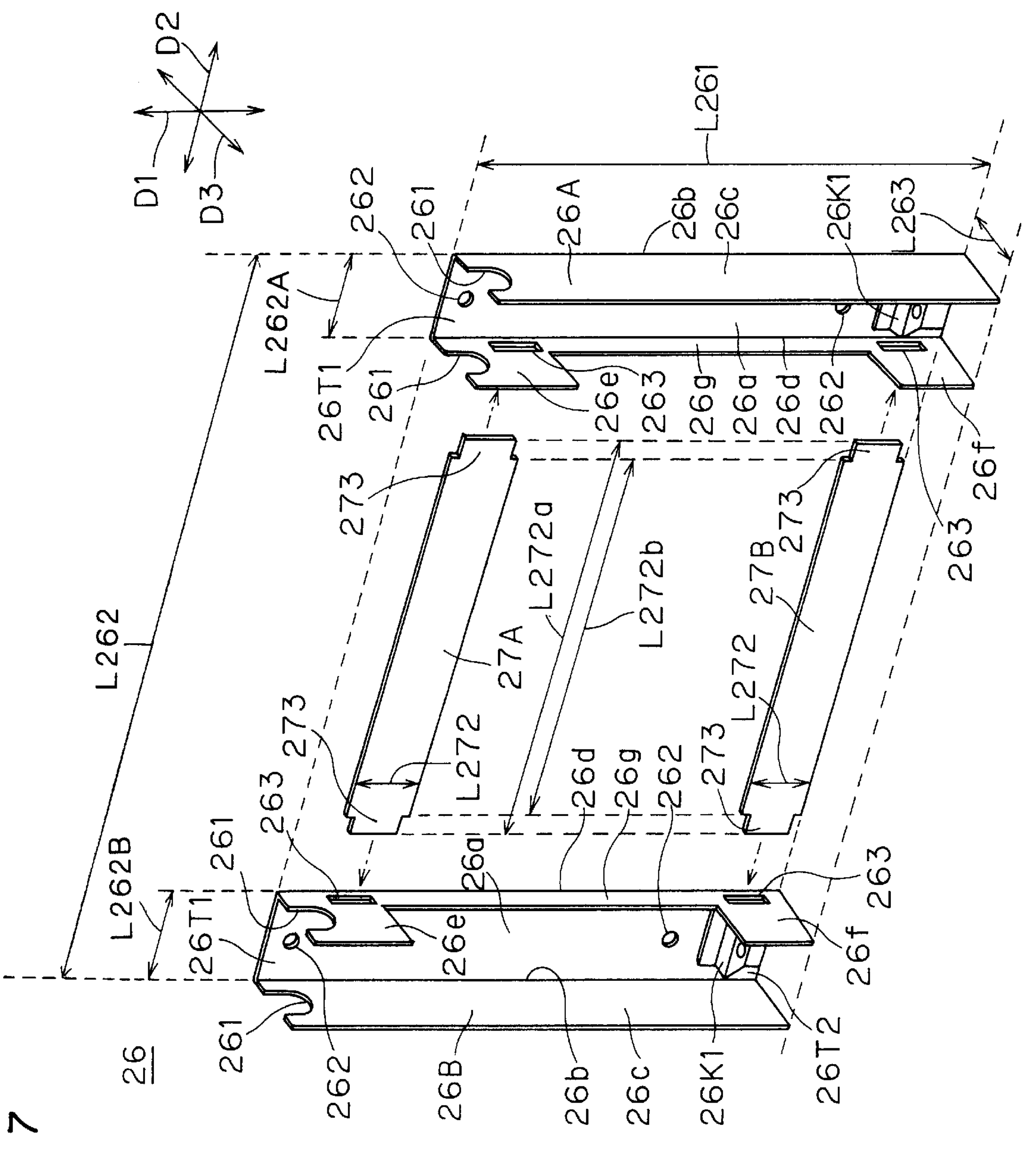
FIG. 7 is a perspective view showing a structure of an installation face side fixing member and an assembly configuration thereof according to the first embodiment.

As shown in FIG. 7, the installation face side fixing member 26 is constituted by first and second installation face side fixing members 26A and 26B and first and second positioning members 27A and 27B (which will be hereinafter referred to as "a positioning member 27") for defining a distance between the first and second installation face side fixing members 26A and 26B. First of all, structures of the first and second installation face side fixing members 26A and 26B having shapes symmetrical with each other will be described in detail.

As shown in FIG. 7, the first and second installation face side fixing members 26A and 26B have widths (lengths) L262A and L262B (L262A=L262B) in the second direction D2 which are greater than the widths (lengths) L252A and L252B of the base member 25*a* of the body side fixing member 25 shown in FIG. 3 or FIG. 4 and a length L261 in the first direction D1 which is equal to the length L251 of the base member 25*a*, and include a plate-shaped portion 26*a* (which will also be referred to as "a base member 26*a*") having a rectangular main surface and section. A hole portion 262 to be used for fixing the installation face side fixing member 26 to the installation face 4 (see FIG. 2) with a screw or the like is formed in each of predetermined positions on the upper side end (third end) 26T1 side and the lower side end (fourth end) 26T2 side in the base member 26*a*.

Furthermore, each of the first and second installation face side fixing members 26A and 26B includes a plate-shaped portion 26*c* having a rectangular main surface and section which is extended in the third direction D3 from one of longer side portions 26*b* in the first direction D1 of the base member 26*a*, and further includes plate-shaped portions 26*e*, 26*f* and 26*g* having rectangular main surfaces and sections which are extended in the third direction D3 from the other longer side portion 26*d* in the first direction D1 of the base member 26*a*.

The plate-shaped portion 26*c* has such a dimension that a length of a longer side in the first direction D1 is equal to that of the base member 26*a* and a length L263 of a shorter side extended in the third direction D3 is almost equal to the length L253 in the third direction D3 of the plate-shaped portion 25*c* shown in FIG. 3.

In particular, an almost U-shaped cut portion 261 in which the projections 251 of the first and second body side fixing members 25A and 25B shown in FIG. 3 or FIG. 4 can be inserted (with a play) is formed in the first direction D1 on the end of the plate-shaped portion 26*c* forming one block of the upper side end (third end) 26T1 facing the first end 25T1 of the body side fixing member 25.

When the cut portion 261 of the first installation face side fixing member 26A is defined as "a first cut portion", the cut portion 261 of the second installation face side fixing member 26B corresponds to "a second cut portion". Thus, both of the first and second cut portions 261 constitute "a second support portion".

On the other hand, the plate-shaped portion 26*e* has, in the first direction D1, a length which is almost equal to the length L251*e* in the first direction D1 of the plate-shaped portion 25*e* shown in FIG. 3 and a length which is almost equal to the length L263 in the third direction D3. Furthermore, an inserting portion 263 which is a slit-shaped through hole capable of inserting an end 273 of the positioning member 27 therein is formed in a predetermined position on the base member 26*a* side of the plate-shaped portion 26*e*.

In particular, a cut portion 261 having the same shape as the shape of the cut portion 261 is formed in a predetermined portion capable of facing the cut portion 261 of the plate-shaped portion 26*c* in an upper edge part of the plate-shaped portion 26*e* forming one block of the upper side end (third end) 26T1. When the cut portion 261 of the plate-shaped portion 26*e* of the first installation face side fixing member 26A is referred to as "a third cut portion", the cut portion 261 of the plate-shaped portion 26*e* of the second installation face side fixing member 26B corresponds to "a fourth cut portion". Both of the third and fourth cut portions form a part of "the second support portion".

Moreover, the plate-shaped portion 26*f* has, in the first direction D1, a length which is almost equal to the length L251*f* in the first direction D1 of the plate-shaped portion 25*f* shown in FIG. 3 and a length which is almost equal to the length L263 in the third direction D3. Furthermore, an inserting portion 263 having the same shape as the shape of the inserting portion 263 is formed in a predetermined position on the base member 26*a* side of the plate-shaped portion 26*f*.

Furthermore, the plate-shaped portion 26*g* has a length in the first direction D1 which is set equal to or greater than the length L111 in the first direction D1 of the projected portion 11 of the display unit 1, and has a predetermined length which is smaller than the length L263 in a direction parallel with the third direction D3 and sets a step dimension of the plate-shaped portions 26*e* and 26*f* in the third direction D3 equal to or smaller than the length (height) H11 in the third direction D3 of the projected portion 11. Each of both ends in the first direction D1 of the plate-shaped portion 26*g* is integrated with each of ends in the first direction D1 of the plate-shaped portions 26*e* and 26*f* which face each other.

In the above and following descriptions, a portion constituted by the upper side end of the base member 26*a* (which is defined by the plate-shaped portion 26*c* and the plate-shaped portion 26*e*), the plate-shaped portion 26*e* and the plate-shaped portion 26*c* facing the plate-shaped portion 26*e* will generally be referred to as an upper side end (a third end) 26T1 of the installation face side fixing member 26 itself, and a portion constituted by the lower side end of the base member 26*a* (a second end which is interposed and defined between the plate-shaped portion 26*c* and the plate-shaped portion 26*f*), the plate-shaped portion 26*f* and the plate-shaped portion 26*c* facing the plate-shaped portion 26*f* will generally be referred to as a lower side end (a fourth end) 26T2 of the installation face side fixing member 26.

The above-mentioned structures of the first and second installation face side fixing members 26A and 26B can be formed by preparing a long member having a U-shaped section seen in the first direction D1, cutting the long member into a member having the length L261, and then cutting and removing a part of one of both planes facing each other with respect to the second direction D2 of the long member and providing a tapped hole 262 for fixing a lower part and an inserting portion (a through hole) 263 in predetermined positions, respectively. Such a portion to be cut and removed is a portion in one of the planes other than portions (corresponding to the plate-shaped portions 26*e* and 26*f*) given apart from both ends by lengths which are almost equal to the lengths L251*e* and L251*f* in a longitudinal direction (first direction D1) and at least a portion given apart from the longer side in the longitudinal direction which is not in contact with two other faces having a "U" shape by a distance which is almost equal to the height H11 of the projected portion 11 of the display unit 1 in a direction (third direction D3) orthogonal to the longitudinal direction (Therefore, a portion remaining in the same direction corresponds to the plate-shaped portion 26*g*).

Accordingly, in the case where the structures of the first and second installation face side fixing members 26A and 26B are seen by such a forming method, it can be understood that the first and second installation face side fixing members 26A and 26B have such a structure as to remove a portion other than the portions (corresponding to the plate-shaped portions 26*e* and 26*f*) given within a range having a length almost equal to the lengths L251*e* and L251*f* from both ends in the longitudinal direction (first direction D1) in one of both facing planes of the long member having a U-shaped section seen in the longitudinal direction and having the length L261, more specifically, at least a portion given apart from the longer side in the longitudinal direction which is not in contact with two other faces forming a "U" shape by a distance corresponding to the height H11 of the projected portion 11 of the display unit 1 (a remaining portion corresponds to the plate-shaped portion 26*g*). In this case, dimensions of two opposed sides, that is, lengths in the third direction D3 of the plate-shaped portions 26*c*, 26*e* and 26*f* are equal to the length L263 and a dimension of a side having the two sides on both ends thereof (that is, a length in the second direction D2 of the base member 26*a*) has lengths L262A and L262B in the above-mentioned "U"-shaped section.

Furthermore, each of the first and second installation face side fixing members 26A and 26B has a hood-shaped member (a second fixing portion) 26K1 which is projected from a surface of the base member 26*a* on the plate-shaped portion 26*c* and 26*f* sides (a face on a side which is not in contact with the installation face) on the end side of the base member 26*a* forming one block of the lower side end (the fourth end) 26T2 (the amount of projection is less than the length L263). A structure of the member 26K1 will be described with reference to FIG. 8 which is an enlarged view showing the vicinity of the lower side end (the fourth end) 26T2 of the first installation face side fixing member 26A. For convenience of the description, FIG. 8 shows the plate-shaped portion 26*c*, a part of which is taken away.

Figure 8:
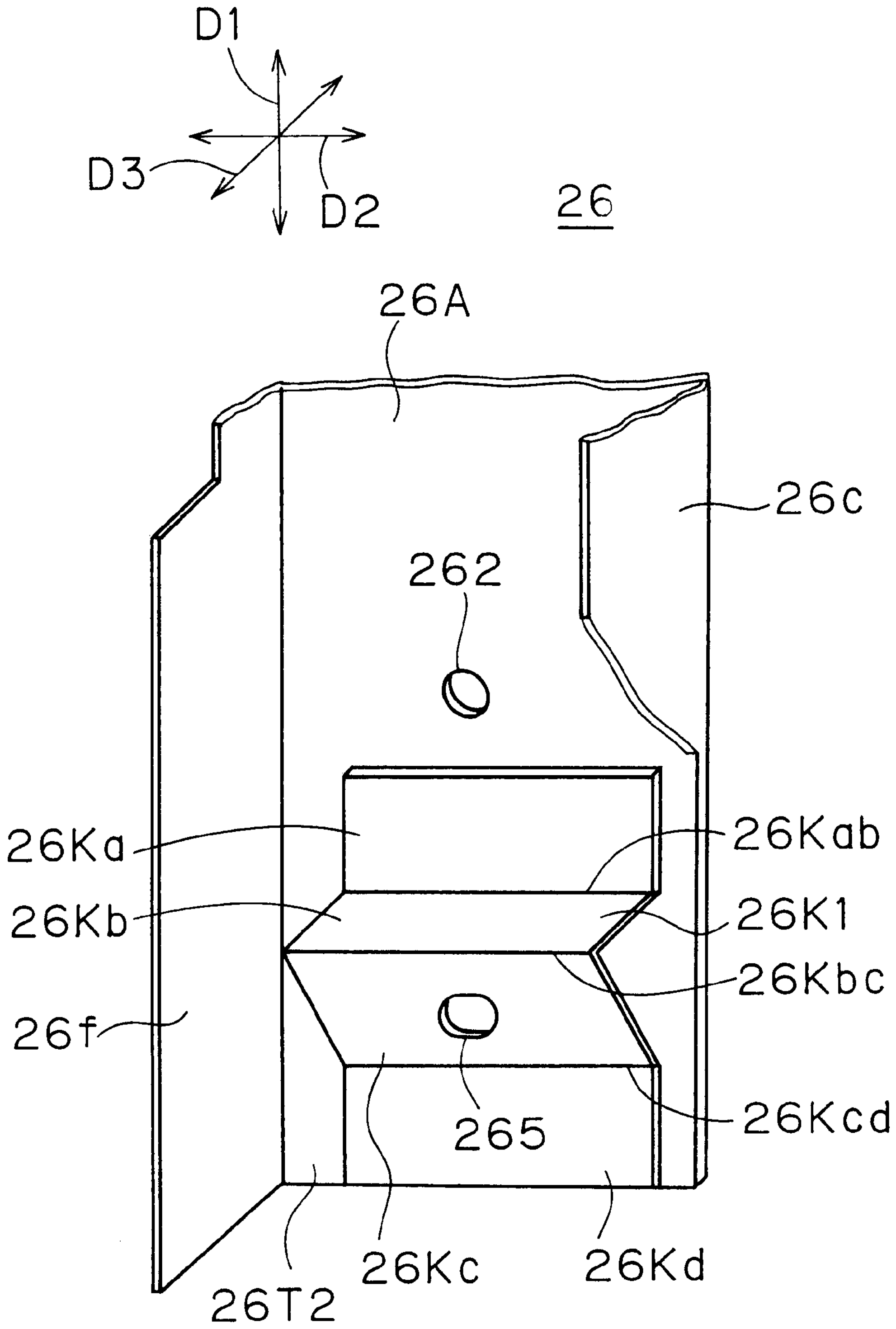
FIG. 8 is an enlarged perspective view showing a structure of a lower side end of the installation face side fixing member according to the first embodiment.

As shown in FIG. 8, the member 26K1 is constituted by integrating four plate-shaped portions 26K*a*, 26K*b*, 26K*c* (the second plate-shaped portions) and 26K*d* having rectangular main surfaces and sections and lengths which are smaller than the lengths L262A and L262B (see FIG. 7) in the second direction D2, respectively.

In detail, the plate-shaped portion 26K*a* is fixed, in the first direction D1, onto the surface of the base member 26*a* on the side where the plate-shaped portions 26*c* and 26*f* are formed, and one of sides in the second direction D2 of the plate-shaped portion 26K*a* is connected to one of sides in the second direction D2 of the plate-shaped portion 26K*b*, thereby forming an edge 26K*ab*.

The plate-shaped portion 26K*b* is provided at a predetermined second tilt angle with respect to the surface of the base member 26*a*, and the other side opposed to the one of the sides of the plate-shaped portion 26K*b* is connected to one of sides in the second direction D2 of the plate-shaped portion 26K*c* on which the tapped hole 265 for fixing a lower part is formed in such a manner that a central axis thereof is coincident with that of the hole portion 255 for fixing a lower part (see FIG. 5 or FIG. 6), thereby forming an edge 26K*bc*.

The other side opposed to the one of the sides of the plate-shaped portion 26K*c* is connected to one of the sides in the second direction D2 of the plate-shaped portion 26K*d* fixed onto the surface of the base member 26*a* in the first direction D1, thereby forming an edge 26K*cd*. In this case, the other side opposed to the one of the sides of the plate-shaped portion 26K*d* is provided above a shorter side in the second direction D2 on the lower side end (the fourth end) 26T2 side of the base member 26*a*. In addition, the plate-shaped portion 26K*c* has a predetermined first tilt angle with respect to the surface of the base member 26*a*, and a sectional shape of a portion constituted by the two plate-shaped portions 26K*b* and 26K*c* is a triangle having the predetermined first and second tilt angles.

Next, a structure of the positioning member 27 will be described.

Figure 9:
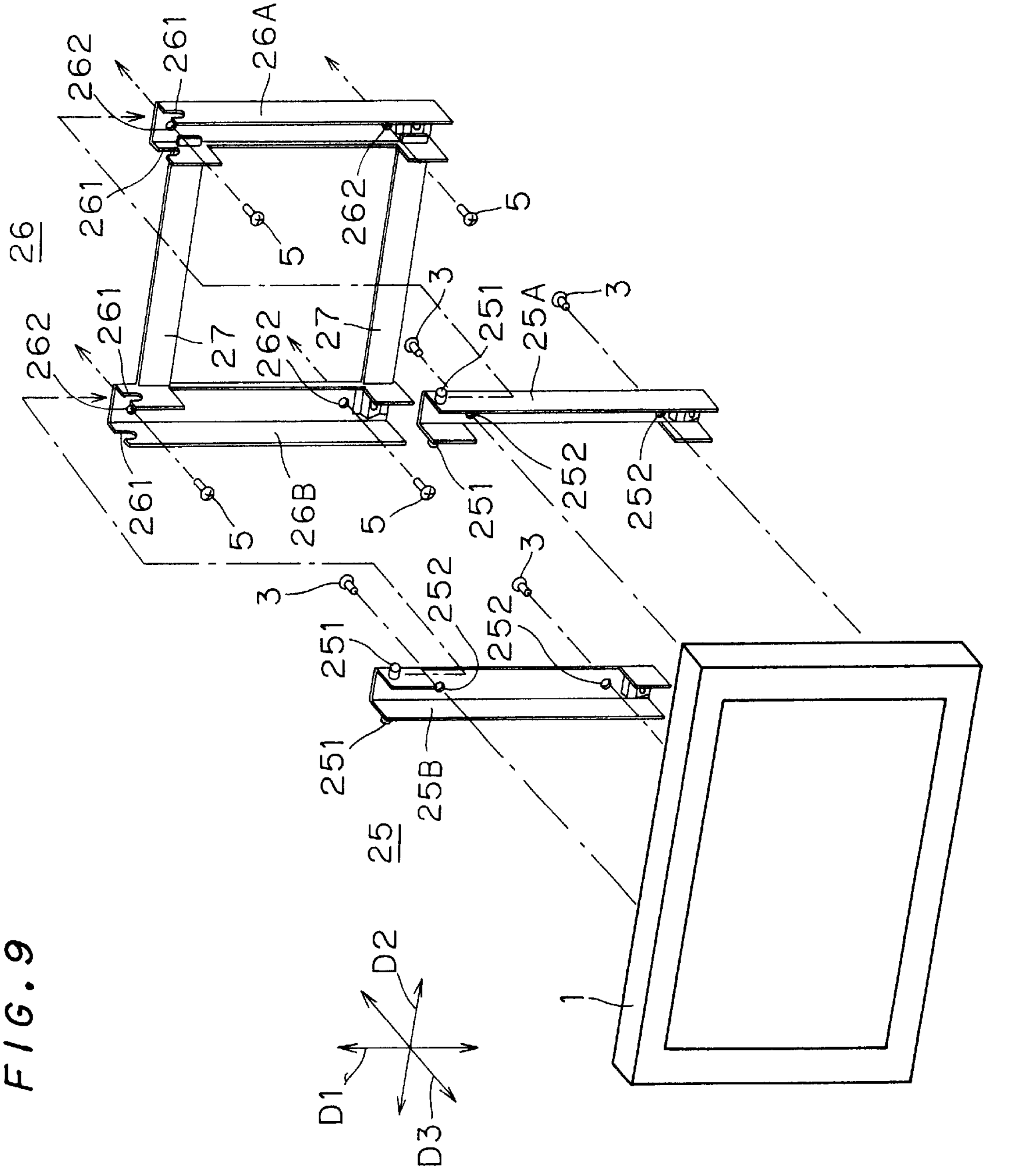
FIG. 9 is a perspective view showing the structure of the flat display device and an assembly configuration thereof according to the first embodiment.

As shown in FIG. 7 or FIG. 9, first and second positioning members 27A and 27B have the same shapes and the same dimensions, respectively. In detail, both the members 27A and 27B are plate-shaped members which have a length or width L272 in the first direction D1 and a length L272*a* in the second direction D2 and have rectangular main surfaces and sections except for both ends. Both ends in the second direction D2 have a step shape having such a width that they can be inserted in the inserting portion 263 of the installation face side fixing member 26. For this reason, the length L272 is set greater than a length in the first direction D1 of the inserting portion 263, and a length in the second direction D2 of a portion which is not inserted in the inserting portion 263 except for the both ends is set to a length L272*b* (<L272*a*).

The both ends 273 of the first positioning member 27A are fitted in the inserting portions 263 on the upper side ends 26T1 of the installation face side fixing members 26A and 26B, respectively. Similarly, the both ends 273 of the second positioning member 27B are fitted in the inserting portions 263 on the lower side ends 26T2 of the both installation face side fixing members 26A and 26B, respectively. Consequently, four members, that is, the first and second installation face side fixing members 26A and 26B and the first and second positioning members 27A and 27B are integrated. Thus, an installation face side fixing member 26 is completed. The installation face side fixing member 26 is screwed and fixed onto the installation face 4 (see FIG. 2) through the hole portion 262 with such an integral state kept. Accordingly, a distance among the facing planes 26*e*, 26*f* and 26*g* of the first and second installation face side fixing members 26A and 26B is defined as the length L272*b* in the second direction D2 of the both positioning members 27A and 27B. As a result, the length L262 in the second direction D2 of the installation face side fixing member 26 is set to (L262A+L262B+L272*b*).

(Method for Assembling Flat Display Device)

A method for assembling a flat display device and a method for installing the same will be described below.

First of all, the display unit 1 having the projected portion 11, the body side fixing member 25 and the installation face side fixing member 26 which have the above-mentioned structures are prepared. In particular, the method for assembling the installation face side fixing member 26 is carried out as shown in FIG. 7 or FIG. 9. More specifically, each end 273 of the first positioning member 27A is fitted in each inserting portion 263 on the upper side end 26T1 of each of the first and second installation face side fixing members 26A and 26B, and each end 273 of the second positioning member 27B is fitted in each inserting portion 263 on the lower side end 26T2 of each of the first and second installation face side fixing members 26A and 26B so that the members 26A, 26B, 27A and 27B are integrated. Thus, the installation face side fixing member 26 is assembled.

The integrated installation face side fixing member 26 is fixed into a predetermined position on the installation face 4 (see FIG. 2) through the hole portion 262 with a screw 5. As long as a distance between the first and second installation face side fixing members 26A and 26B can properly be set, the positioning member 27 does not need to be used.

As shown in FIG. 4 or FIG. 9, next, the first and second body side fixing members 25A and 25B are fixedly provided on the upper face 113 of the projected portion 11 of the display unit 1.

In detail, a surface of each of the base members 25*a* of the first and second body side fixing members 25A and 25B, more specifically, a surface (back face) on the side having the plate-shaped portions 25*c*, 25*e* and 25*f* projected in the third direction D3 is caused to come in contact with an end region in the second direction D2 in the upper face 113 of the projected portion 11 (a region where two holes 114 are formed in the first direction D1), and a surface (back face) of the plate-shaped portion 25*c* on the side facing the plate-shaped portions 25*e* and 25*f* is caused to come in contact with the first side face 111 of the projected portion 11 (they may face each other with a clearance provided therebetween). In addition, each of the first and second body side fixing members 25A and 25B is provided on the projected portion 11 such that both ends 25T1 and 25T2 are projected from the upper face 113 in the first direction D1. The body side fixing member 25 is fixed to the upper face 113 of the projected portion 11 with a screw 3 through each of the tapped holes 252 of the first and second body side fixing members 25A and 25B and the tapped hole 114 on the upper face 113 which have central axes coincident with each other in that state.

Figure 10:
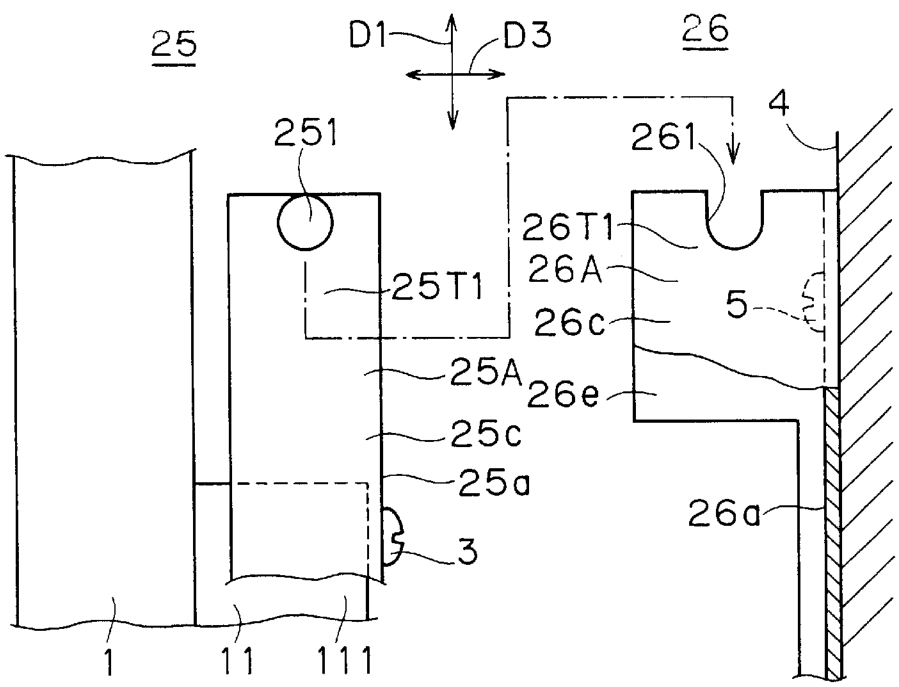
FIG. 10 is an enlarged side view showing the structure of the flat display device and the assembly configuration thereof according to the first embodiment.
Figure 11:
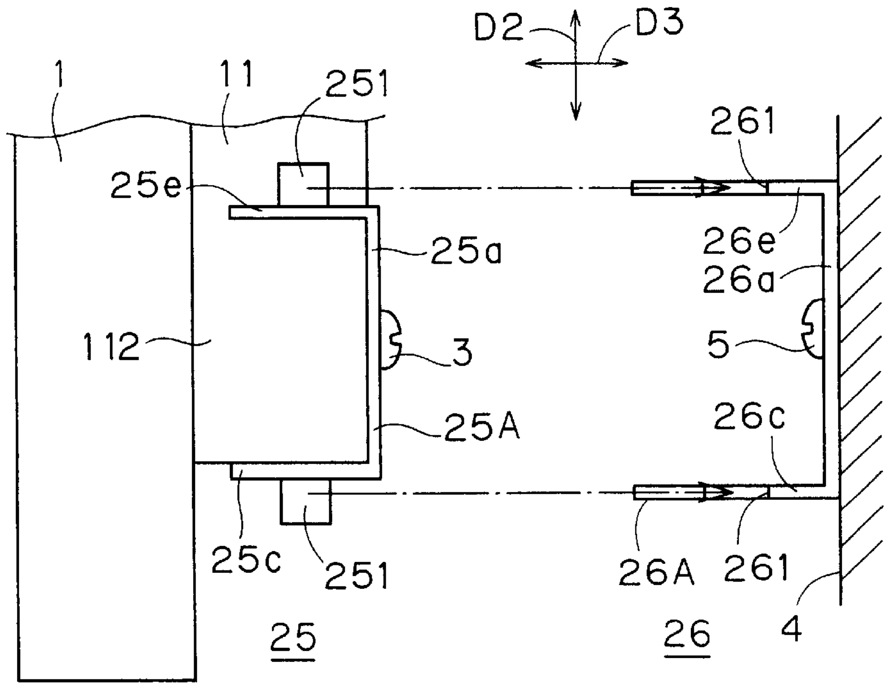
FIG. 11 is an enlarged top view showing the structure of the flat display device and the assembly configuration thereof according to the first embodiment.

Next, the display unit 1 to which the body side fixing member 25 is fixed is installed on the installation face side fixing member 26. This method will be described below with reference to FIGS. 9 to 15. FIG. 10 is a side view (an enlarged view) showing, in the second direction D2, a situation in which the flat display device is installed in FIG. 9, and FIG. 11 is a top view (an enlarged view) showing, in the first direction D1, the situation in which the flat display device is installed in FIG. 9. In order to avoid complexity of the drawings, the screws 3 and 5 are omitted in FIG. 15.

As shown in FIGS. 9 to 11, two projections (comprising first and third projections) 251 of the first body side fixing member 25A are inserted into corresponding cut portions (which correspond to first and third cut portions) 261 of the first installation face side fixing member 26A respectively, and projections (comprising second and fourth projections) 251 of the second body side fixing member 25B are similarly inserted into corresponding cut portions (which correspond to second and fourth cut portions) 261 of the second installation face side fixing member 26B, respectively. Consequently, the first to fourth projections 251 are inserted with a play in the first to fourth cut portions 261 respectively, and are supported in that state. As a result, the display unit 1 is provided on the installation face 4.

Figure 14:
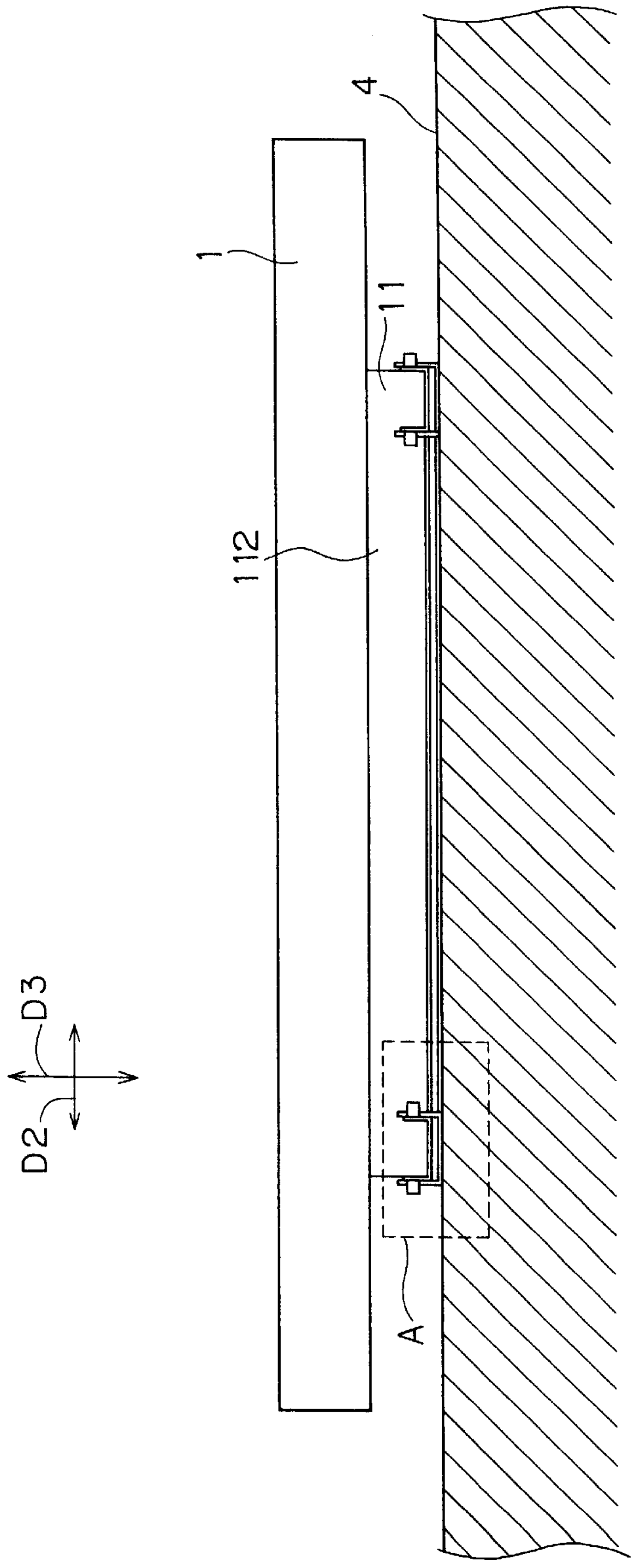
FIG. 14 is a top view showing the structure of the flat display device and the installation configuration thereof according to the first embodiment.
Figure 15:
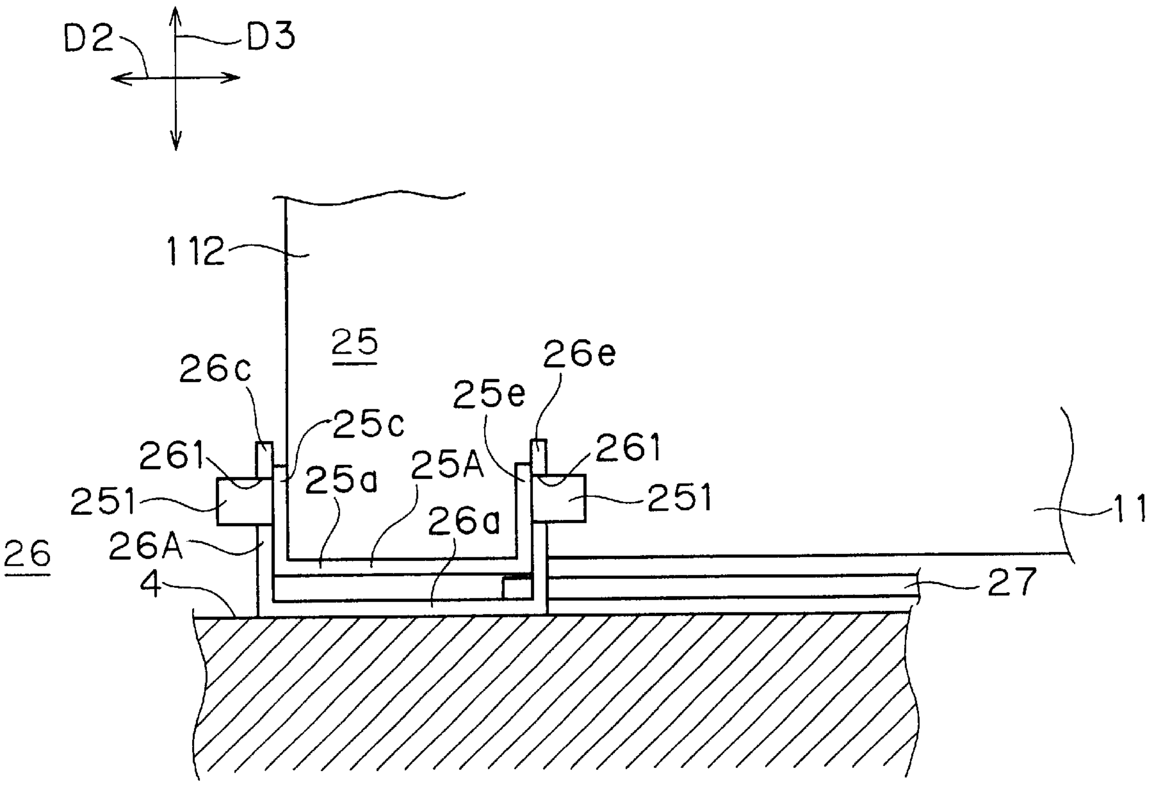
FIG. 15 is an enlarged top view showing the structure of the flat display device and the installation configuration thereof according to the first embodiment.

In the flat display device thus installed on the installation face 4, the projection 251 and the cut portion 261 are supported each other as shown in top views of FIGS. 14 and 15 (enlarged views showing an A portion enclosed by a broken line in FIG. 14) and the side view of FIG. 2 described above. The projection 251 will generally be referred to as "a first support portion 251" and the cut portion 261 will generally be referred to as "a second support portion 261". The "first support portion" can be constituted by at least one of the two projections of the first body side fixing member 25A and one of the two projections of the second body side fixing member 25B, among the four projections 251 in FIG. 4. Accordingly, a minimum structure of the "second support portion" is similarly determined according to the case of the "first support portion".

Figure 12:
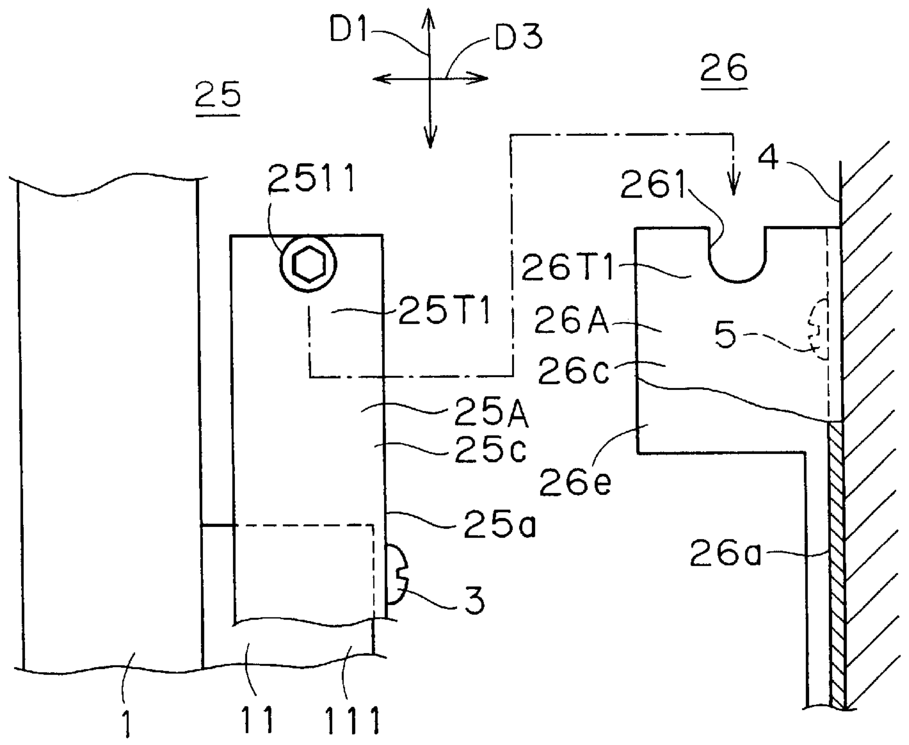
FIG. 12 is an enlarged side view showing the structure of the flat display device and the assembly configuration thereof according to the first embodiment.
Figure 13:
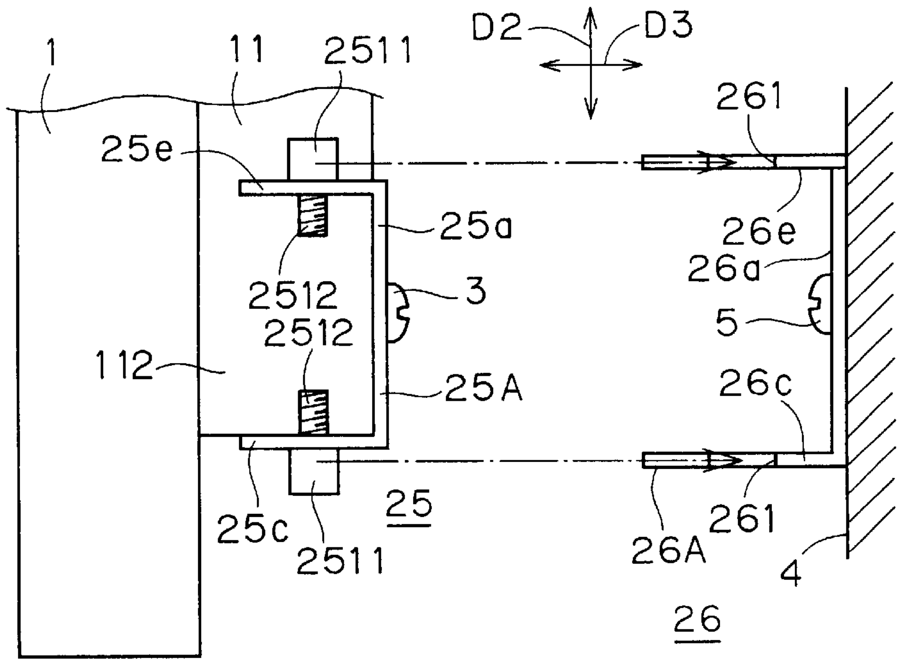
FIG. 13 is an enlarged top view showing the structure of the flat display device and the assembly configuration thereof according to the first embodiment.

For example, a head portion 2511 of a hexagon socket head cap bolt shown in a side view of FIG. 12 and a top view of FIG. 13 can be used as the columnar or cylindrical projection or the first support portion 251. In this case, a tapped hole is formed in a position where the projection 251 (see FIG. 10 or FIG. 11) is to be provided, thereby screwing a screw portion 2512 of the hexagon socket head cap bolt to the tapped hole. Consequently, the projection 251 can be formed.

In the flat display device, furthermore, the body side fixing member 25 and the installation face side fixing member 26 are supported on the upper side end 25T1 and 26T1 sides and are provided on the installation face 4. Then, the body side fixing member 25 and the installation face side fixing member 26 are screwed and fixed on the lower side end 25T2 and 26T2 sides of the both members 25 and 26. In such a respect, description will be given with reference to FIG. 16 which is a sectional view showing the case where the flat display device (particularly in the vicinity of the lower side ends 25T2 and 26T2) in FIG. 2 described above is cut away on a plane including the first and third directions D1 and D3.

As described above, the flat display device comprises the hood-shaped member (first fixing portion) 25K1 of the body side fixing member 25 (see FIG. 5 or FIG. 6) and the hood-shaped member (second fixing portion) 26K1 of the installation face side fixing member 26 (see FIG. 8), and has such a structure that the projection of the hood-shaped member 26K1 can be inserted in a concave portion of the hood-shaped member 25K1. In addition, in a state in which the body side fixing member 25 is attached to the installation face side fixing member 26 by a work for inserting the projection 251 into the cut portion 261, the plate-shaped portion 25K*c* and the plate-shaped portion 26K*c* which are tilted at the same angle in the same direction are in surface-to-surface contact with each other, and a central axis of the hole portion 255 for fixing a lower part of the body side fixing member 25 and that of the tapped hole 265 for fixing a lower part of the installation face side fixing member 26 are coincident with each other as shown in FIG. 16. In other words, the shapes and formation angles of the both members 25K1 and 26K1 are regulated or set such that the plane contact and the coincidence of the central axes can be implemented after the inserting work.

Consequently, the body side fixing member 25 and the installation face side fixing member 26 can be fastened to each other with a screw (fixing member) 7 through the hole portion 255 for fixing a lower part and the tapped hole 265 for fixing a lower part. Thus, the body side fixing member 25 is fixed to the installation face side fixing member 26.

In accordance with the flat display device which has the above-mentioned structure and is provided on the installation face according to the above-mentioned procedure, the following effects can be obtained.

Figure 34:
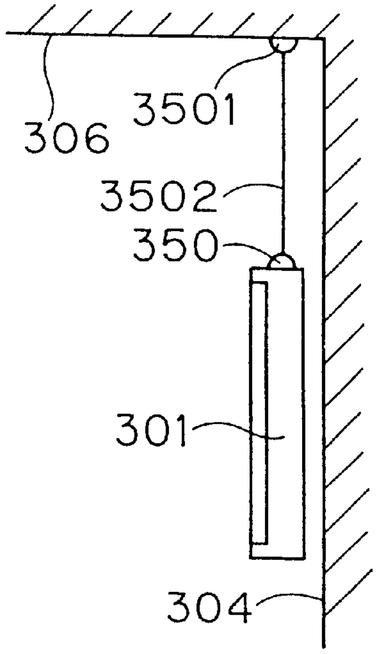
FIG. 34 PRIOR ART
FIG. 34 is a side view showing a structure of a flat display device and an installation configuration thereof according to a third background art.
Figure 35:
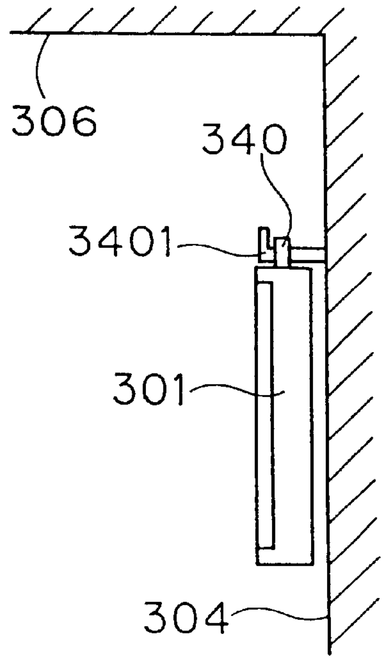
FIG. 35 PRIOR ART
FIG. 35 is a side view showing the structure of the flat display device and the installation configuration thereof according to the third background art.

(a) In the flat display device, the projection 251 of the body side fixing member 25 fixed to the projected portion 11 on the rear face 1R side of the display unit 1 and the cut portion 261 of the installation face side fixing member 26 fixed to the installation face 4 are supported each other on the upper side ends 25T1 and 26T1 of the both members 25 and 26. Furthermore, the hole portion 255 for fixing a lower part and the tapped hole 265 for fixing a lower part are fastened to each other with the screw 7 in the lower side ends 25T2 and 26T2 of the both members 25 and 26. Accordingly, the two members 25 and 26 are firmly fixed to each other by the support of the projection 251 obtained by the cut portion 261 and the fastening performed with the screw 7. In addition, the display unit 1 and the body side fixing member 25 are firmly fixed to each other by the fastening obtained with the screw 3. Consequently, the flat display device or the display unit 1 is tightly fixed onto the installation face 4. Differently from the first to third background arts, therefore, the fixation of the display unit and the wall member can be prevented from slipping off or shifting. As a matter of course, the display unit 301 shown in FIG. 34 or FIG. 35 can be prevented from colliding with the side wall surface 304 differently from the third background art.

In addition, both the body side fixing member 25 and the installation face side fixing member 26 have "L"-shaped sections seen in the first direction D1 or "U"-shaped sections obtained by combining two "L" shapes opposed to each other as shown in FIG. 9, for example. Therefore, the strengths of the both members 25 and 26 themselves are very high.

Figure 29:
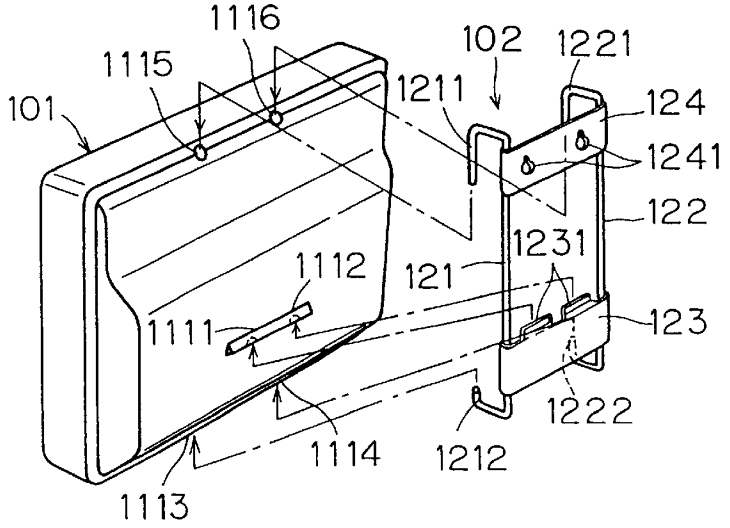
FIG. 29 PRIOR ART
FIG. 29 is a perspective view showing a structure of a flat display device and an assembly configuration thereof according to a first background art.
Figure 30:
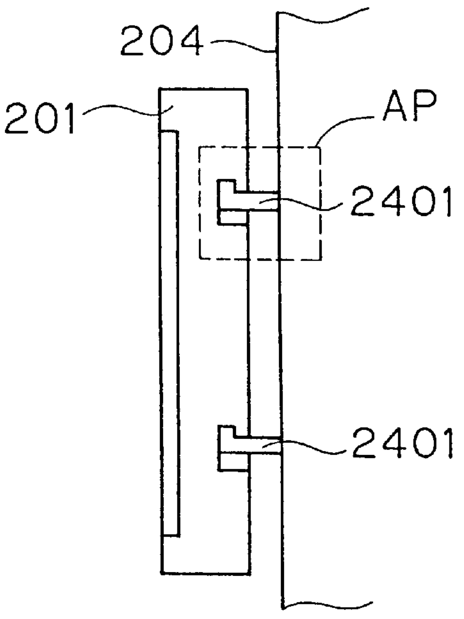
FIG. 30 PRIOR ART
FIG. 30 is a sectional side view showing a structure of a flat display device and an installation configuration thereof according to a second background art.
Figure 31:
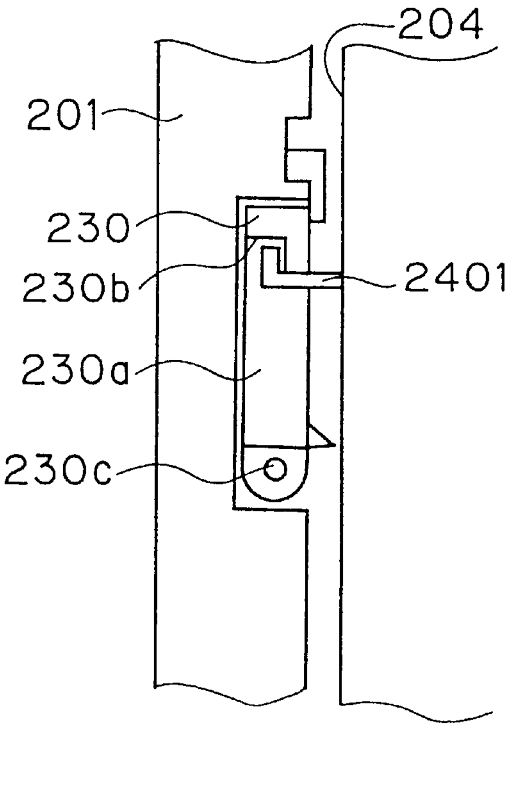
FIG. 31 PRIOR ART
FIG. 31 is an enlarged sectional side view showing the structure of the flat display device and the installation configuration thereof according to the second background art.
Figure 32:
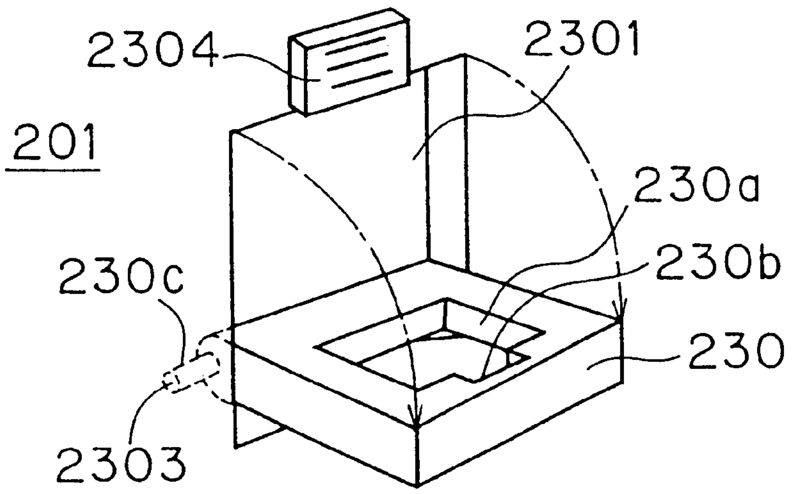
FIG. 32 PRIOR ART
FIG. 32 is an enlarged perspective view showing a structure of an engaging portion according to the second background art.
Figure 33:
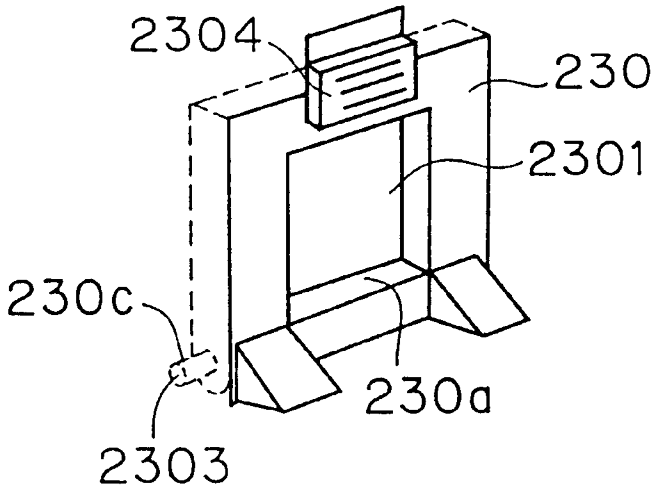
FIG. 33 PRIOR ART
FIG. 33 is an enlarged perspective view showing the structure of the engaging portion according to the second background art.
Figure 36:
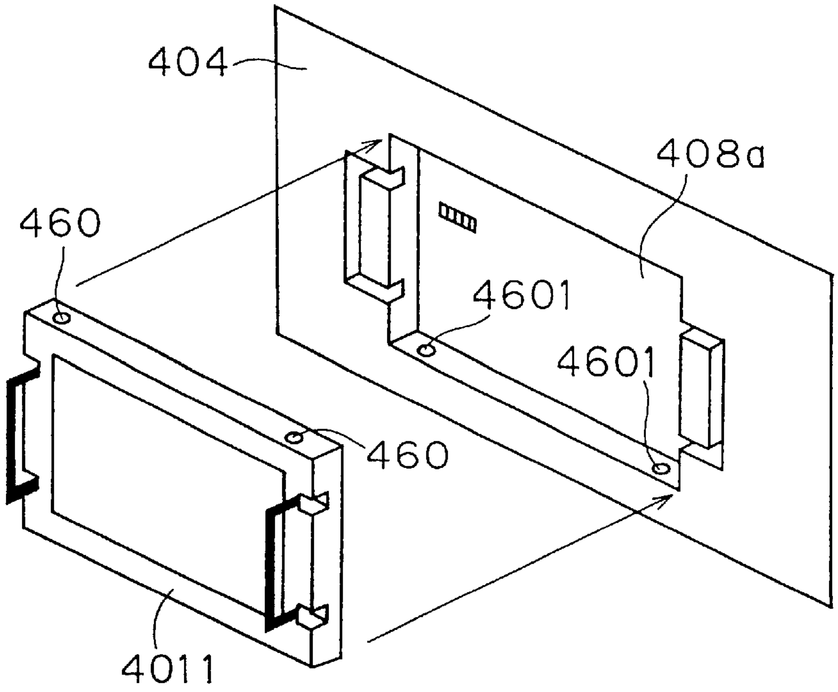
FIG. 36 PRIOR ART
FIG. 36 is a perspective view showing a structure of a flat display device and an installation configuration thereof according to a fourth background art.
Figure 37:
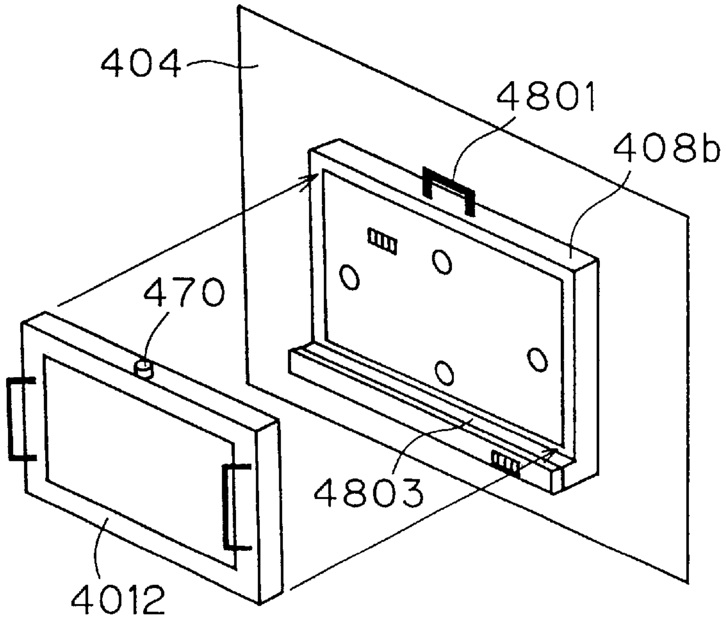
FIG. 37 PRIOR ART
FIG. 37 is a perspective view showing the structure of the flat display device and the installation configuration thereof according to the fourth background art.
Figure 38:
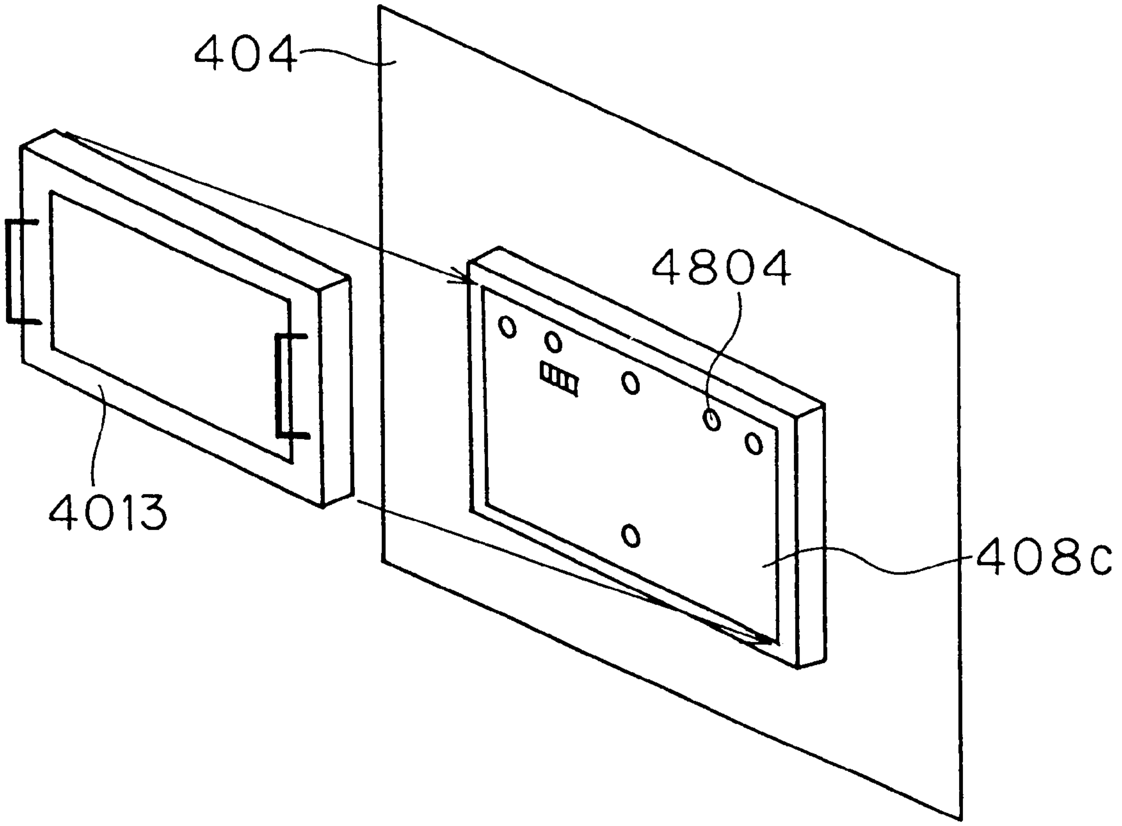
FIG. 38 PRIOR ART
FIG. 38 is a perspective view showing the structure of the flat display device and the installation configuration thereof according to the fourth background art.

(b) Furthermore, the body side fixing member 25 and the installation face side fixing member 26 basically have simple structures which can be formed by cutting and bending of the plate-shaped member or cutting of the "U"-shaped long member. Moreover, the projected portion 11 for fixing the body side fixing member 25 to the display unit 1 also has a very simple structure. Differently from the structures of the fixing member 102 according to the first background art shown in FIG. 29, the engaging portion 230 capable of being housed in the concave portion 2301 provided on the back face of the display unit 201 according to the second background art shown in FIGS. 30 to 33, and the mounts 408*b* and 408*c* according to the fourth background art shown in FIGS. 37 and 38 or a portion where the display units 4012 and 4013 and the mounts 408*b* and 408*c* are fitted in, the members to be installed on the wall surface do not need to have a high dimensional precision. According to the flat display device, of course, it is not necessary to process the wall surface 404 in the same manner as the attaching portion 408*a* according to the fourth background art shown in FIG. 36.

Accordingly, the flat display device and the both fixing members 25 and 26 can considerably reduce the conventional member and manufacturing costs as compared with the members and the like according to the first, second and fourth background arts.

(c) As shown in FIG. 9, for example, the body side fixing member 25 is constituted by the first and second body side fixing members 25A and 25B which are provided on only both ends in the second direction D2 of the projected portion 11 of the display unit 1. On the other hand, the installation face side fixing member 26 is constituted by only the first and second installation face side fixing members 26A and 26B and the first and second positioning members 27A and 27B for defining a distance between the both fixing members 26A and 26B. Accordingly, the body side fixing member 25 and the installation face side fixing member 26 have very light weights as compared with a mount formed of a large-sized member, for example, the mounts 408*b* and 408*c* according to the fourth background art shown in FIGS. 37 and 38.

Figure 39:
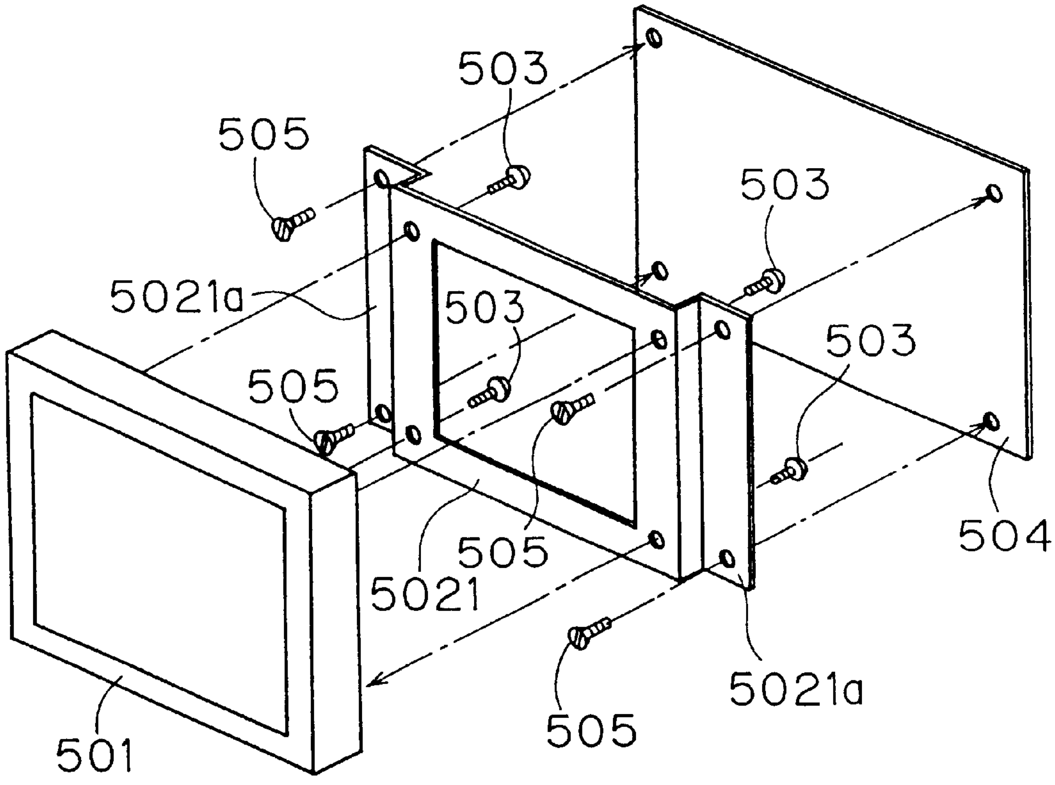
FIG. 39 BACKGROUND ART
FIG. 39 is a perspective view showing a structure of a flat display device and an installation configuration thereof according to a fifth background art.
Figure 40:
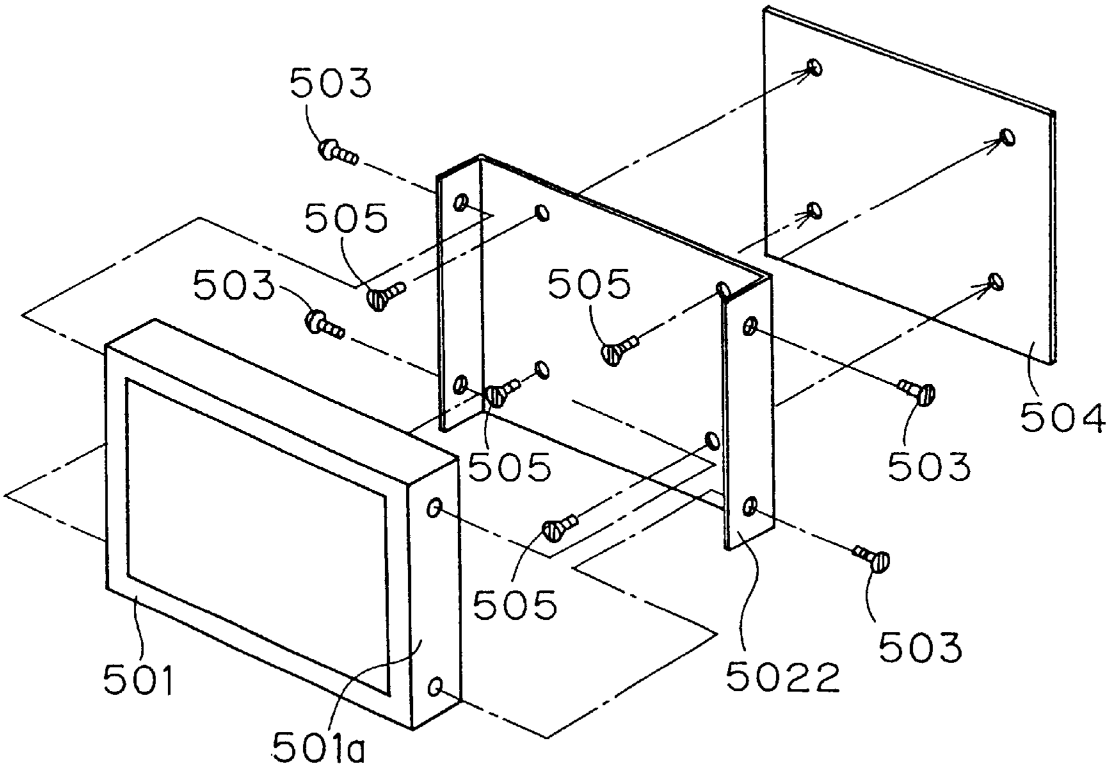
FIG. 40 BACKGROUND ART
FIG. 40 is a perspective view showing the structure of the flat display device and the installation configuration thereof according to the fifth background art.

(d) As shown in FIGS. 9 to 13, in the flat display device, the display unit 1 can be provided on the installation face 4 by previously inserting the projection 251 of the upper side end 25T1 of the body side fixing member 25 fixed to the display unit 1 into the cut portion 261 of the upper side end 26T1 of the installation face side fixing member 26 fixed into a predetermined position on the installation face 4. As shown in FIG. 16, furthermore, a work for fastening the both members 25 and 26 with the screw 7 in the both lower side ends 25T2 and 26T2 can be performed after the above-mentioned insertion of the projection 251 into the cut portion 261. In addition, the plate-shaped portions 25K*c* and 26K*c* in the hood-shaped members 25K1 and 26K1 are tilted with respect to the installation face 4. Therefore, such a work can be performed obliquely below the flat display device. In particular, this advantage can be obtained remarkably when the installation face 4 is a wall surface which cannot easily be screwed in a transverse direction. Accordingly, it is possible to provide a flat display device in which a workability is enhanced more rapidly than the work for attaching the display unit 501 according to the fifth background art shown in FIGS. 39 and 40.

(e) In the flat display device, the body side fixing member 25 is provided with a surface of each of the members 25*a* of the first and second body side fixing members 25A and 25B, more specifically, a surface on the side having the plate-shaped portions 25*c*, 25*e* and 25*f* projected in the third direction D3 in contact with the upper face 113 of the projected portion 11 as shown in FIGS. 9 to 15. Furthermore, the lengths L262A and L262B in the second direction D2 of the base members 26*a* of the first and second installation face side fixing members 26A and 26B (see FIG. 7) are greater than the lengths L252A and L252B in the second direction D2 of the base members 25*a* of the first and second body side fixing members 25A and 25B (see FIG. 3). As shown in FIG. 15, therefore, the first and second body side fixing members 25A and 25B are housed in the "U"-shapes of the first and second installation face side fixing members 26A and 26B, respectively.

Although the body side fixing member 25 and the installation face side fixing member 26 themselves have the lengths L253 and L263 in the third direction D3 (see FIGS. 4 and 7), the distance between the rear face 1R of the display unit 1 (see FIG. 4) and the installation face 4 is almost equal to the height H11 of the projected portion 11 (see FIG. 4) in the flat display device as shown in FIGS. 14 and 15. According to the flat display device, therefore, the amount of projection of the flat display device from the installation face 4 can be suppressed. Therefore, it is possible to provide an attaching structure of the flat display device which exactly makes the most of the features of a thin flat display device using a plasma display panel and the like.

(f) As shown in FIGS. 2 to 4, furthermore, the both ends 25T1 and 25T2 of the body side fixing member 25 are provided on the projected portion 11 to be projected from the upper face 113 in the first direction D1. In addition, the lengths L251*e* and L251*f* in the first direction D1 of the projected portions, that is, a part having the plate-shaped portions 25*e* and 25*f* of the both ends 25T1 and 25T2 in the first direction D1 are set shorter than the distance between the second side face 112 of the projected portion 11 and the side face in the first direction D1 of the display unit 1. Moreover, the lengths L251 and L261 in the first direction D1 of the body side fixing member 25 and the installation face side fixing member 26 (see FIGS. 3 and 7) are set shorter than the length L11 in the first direction D1 of the display unit 1. In other words, it is apparent that a position where the projected portion 11 is to be provided on the rear face 1R is defined to obtain the relationship among these lengths. Accordingly, the body side fixing member 25 and the installation face side fixing member 26 do not protrude from an outer frame of the display unit 1 as seen from the forward side of a front face of the display unit 1 (a face opposed to the rear face 1R). In this respect, the flat display device is superior to the suspending members 350, 3501 and 3502 and the wall members 340 and 3401 according to the third background art shown in FIGS. 34 and 35 and the fixing member 5021 according to the fifth background art shown in FIG. 39, and the dimension and installation space of the whole flat display device can be reduced.

In the flat display device according to the first embodiment, the body side fixing member 25 and the installation face side fixing member 26 are firmly fixed to each other on the both lower side ends 25T2 and 26T2. Therefore, the manner of "insertion" of the projection 251 into the cut portion 261 may take any of the case ① where the insertion is performed without a play between the both portions 251 and 261 ("fitting") and the case ② where the insertion is performed with a play between the both portions 251 and 261 ("insertion with a play").

(First Variant of First Embodiment)

Figure 16:
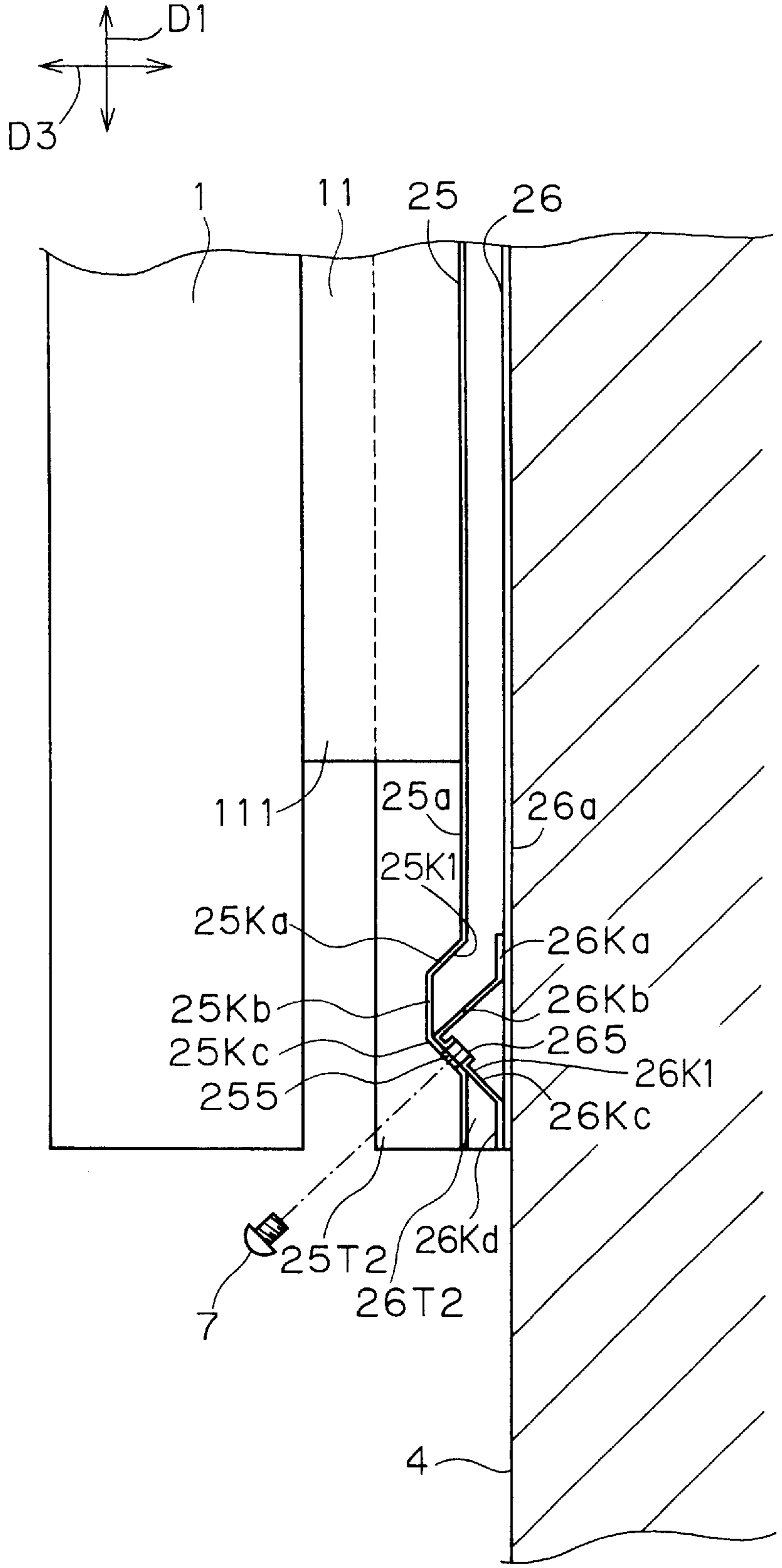
FIG. 16 is an enlarged sectional side view showing the structure of the flat display device and the installation configuration thereof according to the first embodiment.

As shown in FIG. 16, in the flat display device according to the first embodiment described above, the hood-shaped member 25K1 (see FIGS. 5 and 6) is formed on the lower side end 25T2 of the body side fixing member 25 and the hood-shaped member 26K1 (see FIG. 8) is formed on the lower side end 26T2 of the installation face side fixing member 26 such that the work for fastening the body side fixing member 25 to the installation face side fixing member 26 with the screw 7 can be performed obliquely below the flat display device.

Figure 17:
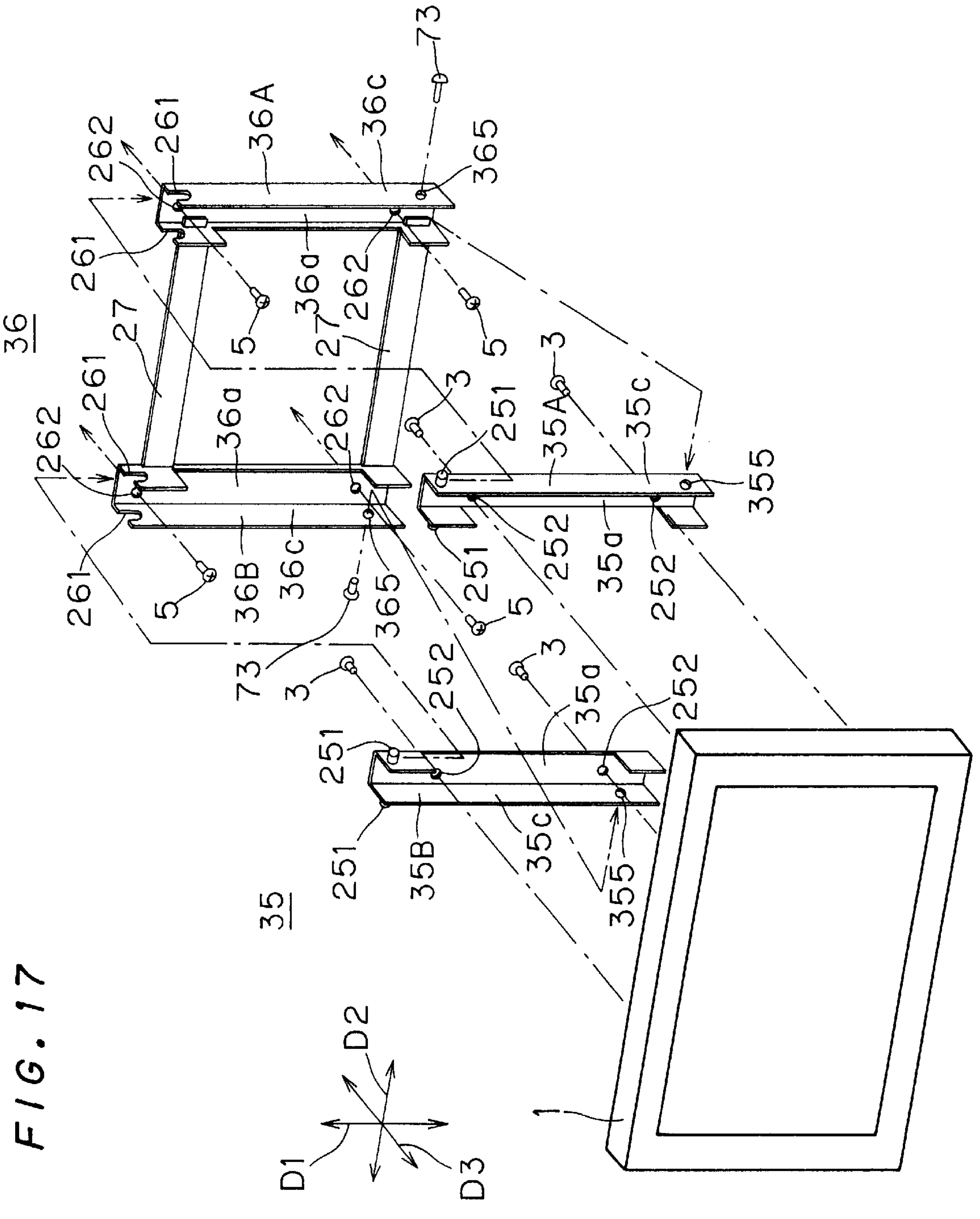
FIG. 17 is a perspective view showing a structure of a flat display device and an assembly configuration thereof according to a first variant of the first embodiment.

On the other hand, as shown in FIG. 17, a body side fixing member 35 comprising first and second body side fixing members 35A and 35B in which a hole portion 355 for fixing a lower part is provided in a predetermined position on an end forming one block of a lower side end (second end) in a plate-shaped portion 35*c* (first plate-shaped portion) corresponding to the plate-shaped portion 25*c* of the body side fixing member 25 shown in FIG. 9 is prepared in place of the opening 25K and the hood-shaped member 25K1 (see FIGS. 5 and 6), and furthermore, an installation face side fixing member 36 comprising first and second installation face side fixing members 36A and 36B and a positioning member 27 in which a tapped hole 365 for fixing a lower part is provided corresponding to the position of the hole portion 355 for fixing a lower part on an end forming one block of a lower side end (second end) of the installation face side fixing member 36 in a plate-shaped portion 36*c* (second plate-shaped portion) corresponding to the plate-shaped portion 26*c* of the body side fixing member 26 shown in FIG. 9 is prepared in place of the hood-shaped member 26K1 (see FIG. 8). These fixing members 35 and 36 may be substituted for the above-mentioned fixing members 25 and 26, respectively.

In this case, the hole portion 355 for fixing a lower part and the tapped hole 365 for fixing a lower part are formed in such a manner that their central axes are coincident with each other when the body side fixing member 35 is housed in a "U" shape of the installation face side fixing member 36.

More specifically, when an end of the plate-shaped portion (first plate-shaped portion) 35*c* is referred to as a first fixing portion and an end of the plate-shaped portion (second plate-shaped portion) is referred to as a second fixing portion, the first and second fixing portions or the first and second plate-shaped portions 35*c* and 36*c* are formed in positions where their planes can come in contact with each other, and are fixed to each other through a screw (fixing member) 73. Consequently, the body side fixing member 35 and the installation face side fixing member 36 are fixed to each other.

When the display unit 1 is to be provided on an installation face 4 by using the body side fixing member 35 and the installation face side fixing member 36, the both fixing members 35 and 36 can perform the fastening work with the screw (fixing member) 73 from both sides in a second direction D2 of the flat display device as shown in FIG. 17. According to the first variant, therefore, it is possible to provide a flat display device in which a workability is enhanced more dramatically as compared with the work for attaching the display unit 501 according to the fifth background art shown in FIGS. 39 and 40. Moreover, a structure can be more simplified than in the first embodiment.

(Second Variant of First Embodiment)

Figure 18:
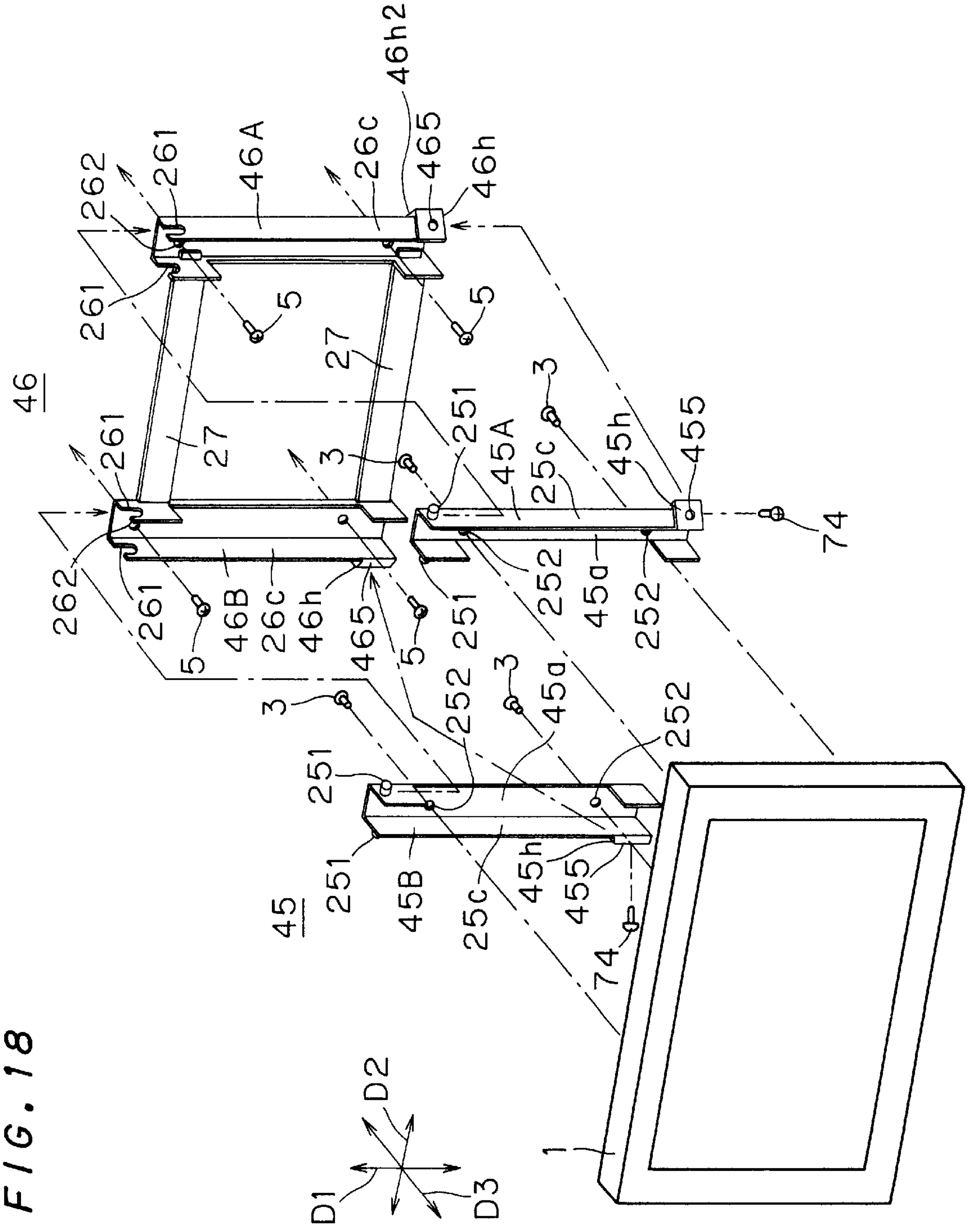
FIG. 18 is a perspective view showing a structure of a flat display device and an assembly configuration thereof according to a second variant of the first embodiment.

As shown in FIG. 18, in a flat display device according to a second variant, a body side fixing member 45 corresponding to the body side fixing member 25 (see FIG. 9) is used and a installation face side fixing member 46 corresponding to the installation face side fixing member 26 (see FIG. 9) is used.

In detail, as shown in FIG. 18, each of first and second body side fixing members 45A and 45B has a plate-shaped portion 45*h* (a first fixing portion or a first plate-shaped portion) which is connected to a lower side end (corresponding to the lower side end 25T2 (see FIG. 4)) of a longer side on the display unit 1 side of the plate-shaped portion 25*c* and which forms a predetermined angle with the plate-shaped portion 25*c* on the outside of a "U" shape in place of the opening 25K and the hood-shaped member 25K1 (see FIGS. 5 and 6). A hole portion 455 for fixing a lower part is formed in a predetermined position of the plate-shaped portion 45*h*.

On the other hand, as shown in FIG. 18, each of first and second installation face side fixing members 46A and 46B has a "V"-shaped member (second fixing portion) comprising plate-shaped portions 46*h* (a second plate-shaped portion or second fixing portion) and 46*h*2 on the outside of a "U"-shape of a lower side end (corresponding to the lower side end 26T2 (see FIG. 7)) of the plate-shaped portion 26*c* in place of the hood-shaped member 26K1 (see FIG. 8). In detail, one of ends of the plate-shaped portion 46*h* is connected to a lower side end of a longer side on the display unit 1 side of the plate-shaped portion 26*c*, the other end of the plate-shaped portion 46*h* is connected to one of ends of the plate-shaped portion 46*h*2, and the other end of the plate-shaped portion 46*h*2 is connected to the lower side end 25T2 (see FIG. 4) of a longer side (corresponding to the longer side 26*b* shown in FIG. 7) of the plate-shaped portion 26*c* on the opposite side of the display unit 1. Moreover, a tapped hole 465 for fixing a lower part is formed in a predetermined position of the plate-shaped portion 46*h*.

In particular, an angle formed by the plate-shaped portion 26*c* and the plate-shaped portion 46*h* is equal to the predetermined angle formed by the plate-shaped portion 25*c* and the plate-shaped portion 45*h*. The hole portion 455 for fixing a lower part and the tapped hole 465 for fixing a lower part are formed in such a manner that their central axes are coincident with each other when the body side fixing member 45 is housed in the "U" shape of the installation face side fixing member 46. Consequently, the second ends or the lower side ends of the both members 45 and 46 are fixed to each other with a screw 74 through the both plate-shaped portions 45*h* and 46*h* overlapping each other. In such a respect, it is also supposed that the plate-shaped portion 46*h*2 is not an essential component. However, the plate-shaped portion 46*h*2 is provided so that the angle formed by the plate-shaped portion 46*h* and the plate-shaped portion 26*c* can reliability be set and held.

When the display unit 1 is to be provided on an installation face 4 by using the body side fixing member 45 and the installation face side fixing member 46, the work for fastening the both fixing members 45 and 46 can be performed with the screw (fixing member) 74 in an obliquely forward direction defined by an angle formed in a third direction D3 which corresponds to the angles formed by the plate-shaped portions 45*h* and 46*h* and the plate-shaped portions 25*c* and 26*c* as shown in FIG. 18. According to the second variant, therefore, it is possible to provide a flat display device in which a workability is enhanced more dramatically as compared with the work for attaching the display unit 501 according to the fifth background art shown in FIGS. 39 and 40. In particular, when the installation face 4 is a wall surface, it is very significant that the present structure is employed.

Second Embodiment

Figure 21:
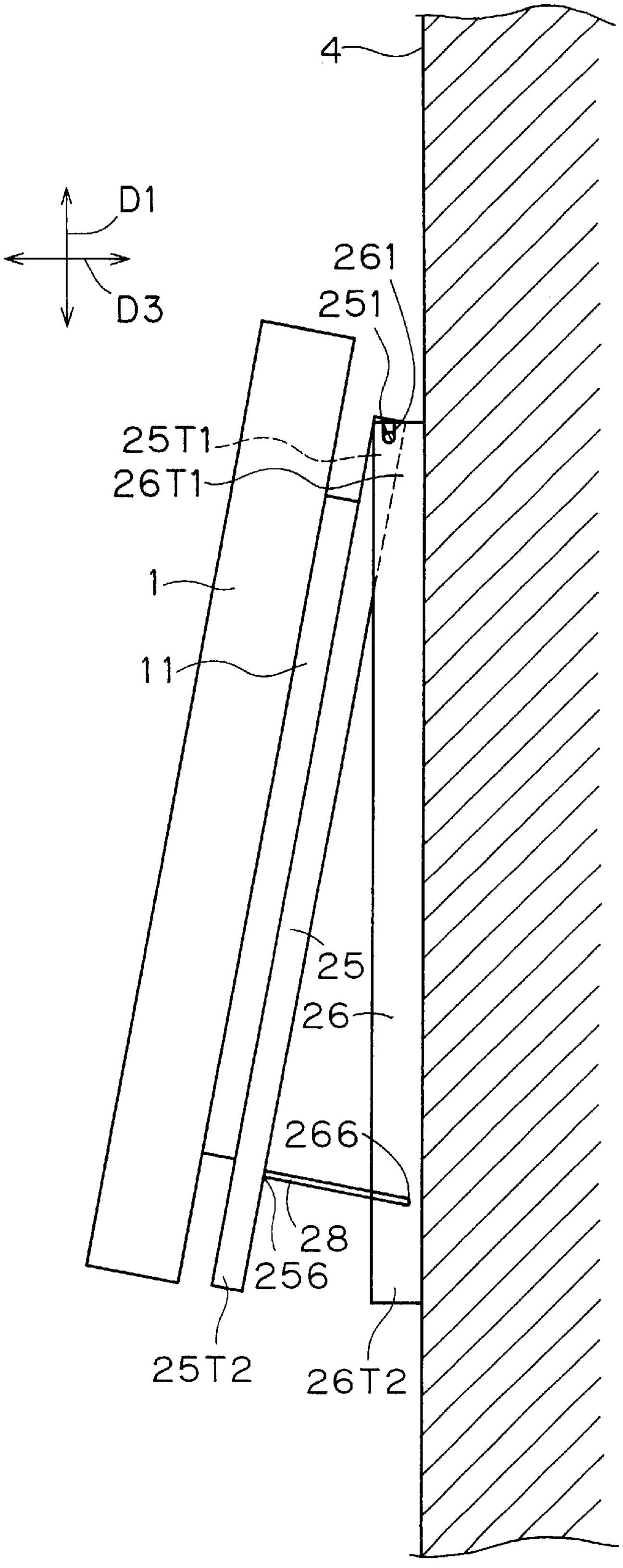
FIG. 21 is a side view showing the structure of the flat display device and the installation configuration thereof according to the second embodiment.

While the lower side ends 25T2 and 26T2 of the body side fixing member 25 and the installation face side fixing member 26 are fastened with the screw 7 so that the display unit 1 or the flat display panel 1*a* (see FIG. 1) is provided in parallel with the installation face 4 as shown in FIG. 16 in the flat display device according to the first embodiment described above, a second embodiment is characterized by a structure of a flat display device which can be provided with the display unit 1 or the flat display panel 1*a* (see FIG. 1) tilted at a predetermined angle with respect to an installation face 4 as shown in FIG. 21 which will be described below. More specifically, a body side fixing member 25 is caused to have a tilt function which will be described below by utilizing a link mechanism including a projection 251 and a cut potion 261 that are supported each other in the state of insertion with a play. This respect will be described below. In the following explanation, the same components as in the flat display device according to the first embodiment described above have the same reference numerals and their description will be omitted.

Figure 19:
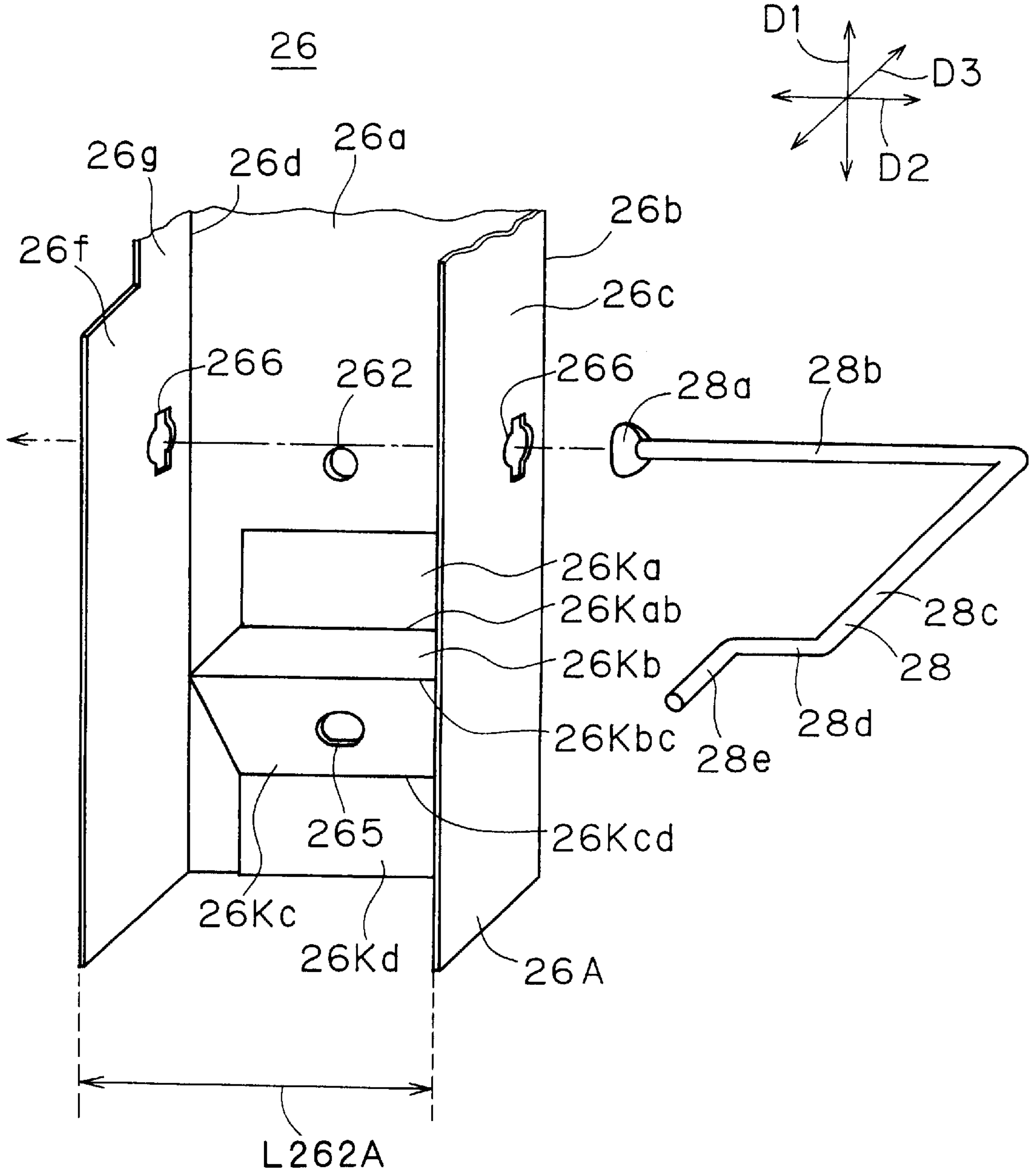
FIG. 19 is an enlarged perspective view showing structures of a lower side end of an installation face side fixing member and a stopper according to a second embodiment.

FIG. 19 is an enlarged perspective view showing a structure of a lower side end of an installation face side fixing member according to the second embodiment. The installation face side fixing member can basically be implemented by using the above-mentioned installation face side fixing member 26. Therefore, the installation face side fixing member according to the second embodiment will be referred to as "an installation face side fixing member 26", and the same components of the installation face side fixing member as in the installation face side fixing member 26 according to the first embodiment have the same reference numerals.

As shown in FIG. 19, hole portions 266 formed by connection of a through hole which is just circular seen in a second direction D2 and a longitudinal slit-shaped through hole provided in a first direction D1 are formed with their central axes coincident with each other in predetermined positions where lower side ends of a plate-shaped portion 26*c* and a plate-shaped portion 26*f* of a first installation face side fixing member 26A projected onto the display unit 1 side from both ends in the second direction D2 of a base member 26*a* face each other in the second direction D2.

The first installation face side fixing member 26A has a stopper 28 which is inserted with a play in the both hole portions 266 to pass through from the plate-shaped portion 26*c* side to the plate-shaped portion 26*f* side and is rotatably supported in a plane defined by the first direction D1 and a third direction D3. Therefore, the hole portion 266 will be hereinafter referred to as "a stopper attaching hole 266". The stopper 28 is a bar processed to have a predetermined shape in order to tilt the body side fixing member 25 at a predetermined angle with respect to the installation face side fixing member 26. More specifically, one of ends of a bar 28*e* having a predetermined length in the third direction D3 is connected to one of ends of a bar 28*d* having a predetermined length in the second direction D2, the other end of the bar 28*d* is connected to one of ends of a bar 28*c* having a predetermined length in the third direction D3, one of ends of a bar 28*b* having a predetermined length in the second direction D2 which is equal to or greater than a length L262A in the second direction D2 of the first installation face side fixing member 26A and having such a diameter as to be inserted with a play in the circular through hole part of the hole portion 266 is connected to the other end of the bar 28*c*, and a head portion 28*a* having such a shape and dimension as to be inserted into the hole portion 266 is formed on the other end of the bar 28*b*.

For example, the stopper 28 is processed and formed by the following procedure. First of all, a bar having such a diameter as to be inserted with a play in the circular through hole part of the hole portion 266 is prepared, the bar is bent in the second direction D2 in a position apart from one of ends of the bar provided having a longitudinal direction thereof coincident with the third direction D3 by a distance corresponding to a length of the bar 28*e*, thereby causing one of end sides of the bar to have an "L" shape, the bar is bent in the third direction D3, more specifically, in a direction opposite to the bar 28*e* in a position apart from the position where the bar has been bent by a distance corresponding to a length of the bar 28*d*, the bar is bent in the second direction D2, more specifically, in the same direction as the direction of the bar 28*d* in a position apart from the position where the bar has been bent by a distance corresponding to a length of the bar 28*c*, cutting is performed leaving an extended portion having a predetermined length in a position apart from the position where the bar has been bent by a distance corresponding to a length of the bar 28*b*, and the extended portion is then interposed between both sides in the third direction D3 and is pressurized or caulked, thereby forming the head portion 28*a*. Thus, the processing of the stopper 28 is completed.

As shown in FIG. 19, the head portion 28*a* as one of ends of the stopper 28 is inserted into the stopper attaching hole 266 of the plate-shaped portion 26*c*, and is inserted with a play such that the head portion 28*a* is projected through the stopper attaching hole 266 of the plate-shaped portion 26*f*.

Figure 20:
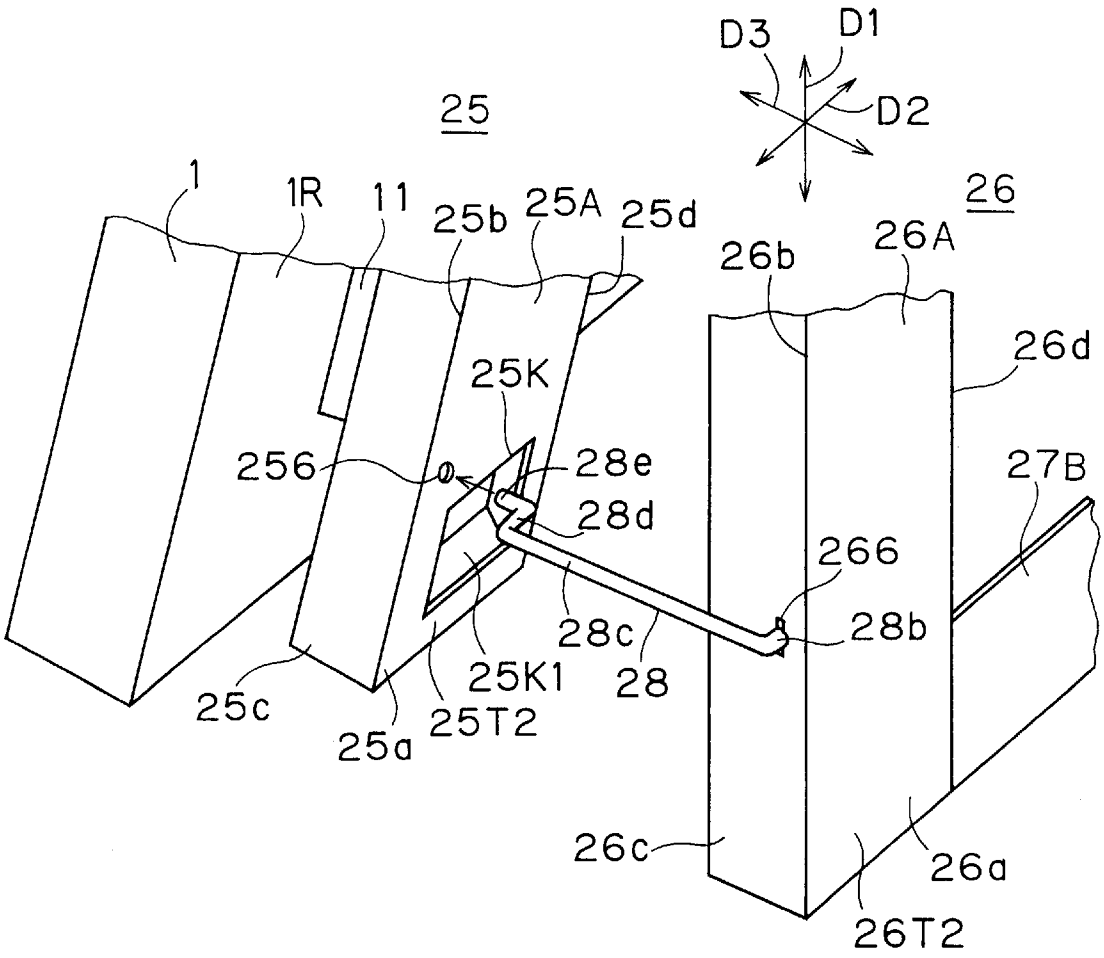
FIG. 20 is an enlarged perspective view showing a structure of a flat display device and an installation configuration thereof according to the second embodiment.

In the flat display device, particularly, the projection 251 and the cut portion 261 are supported each other in such a manner that the insertion of the projection 251 in the cut portion 261 with a play causes the body side fixing member 25 or the display unit 1 to be rotatable at a rotating angle in a plane defined by the third direction D3 and the first direction D1 as shown in FIGS. 20 and 21.

Therefore, while the display unit 1 and the body side fixing member 25 are rotated at a predetermined angle (tilt angle) with respect to the installation face 4 or the installation face side fixing member 26, the bar 28*e* as the other end of the stopper 28 is inserted into a stopper receiving hole 256 provided in a portion forming a lower side end 25T2 in the plate-shaped portion 25*a* of the body side fixing member 25A, more specifically, a position corresponding to the stopper attaching hole 266 in the first direction D1 as shown in FIGS. 20 and 21. Consequently, the display unit 1 can be tilted and held at the predetermined angle toward a top face. Holding of such a tilt state will be hereinafter referred to as "tilt" and a mechanism (function) for holding such a tilt state will be hereinafter referred to as a "tilt mechanism (function)".

Accordingly, the flat display device produces the following effects. More specifically, (g) the display unit 1 is supported on the installation face side fixing member 26 provided on the installation face 4 and is then tilted up to a constant angle. The tilt state can be held. In this case, a constant space is formed and held between the lower side end 25T2 of the body side fixing member 25 and the lower side end 26T2 of the installation face side fixing member 26. Therefore, also after the display unit 1 is provided on the installation face 4, it is possible to easily perform a work for connecting a cable to a connector provided on a rear face of the display unit 1, a maintenance work for the display unit 1 and the like. Accordingly, it is possible to provide a flat display device capable of being hung on a wall in which various workabilities related to the device are more enhanced as compared with the flat display device according to the fifth background art shown in FIGS. 39 and 40.

(h) Furthermore, in the case where the display unit 1 or the flat display panel 1*a* (see FIG. 1) is tilted and such a tilt state is held when using the flat display device, visibility of the flat display device can also be enhanced.

While the case where the stopper attaching hole 266 and the stopper receiving hole 256 are provided on side faces (plate-shaped portions 26*c* and 25*c*) of the first installation face side fixing member 26A and the first body side fixing member 25A to attach the stopper 28 thereto has been described above, it is a matter of course that the stopper attaching hole 266 may be formed on both side faces (plate-shaped portions 26*c*) of the first and second installation face side fixing members 26A and 26B and the stopper receiving hole 256 may be formed on both side faces (25*c*) of the first and second body side fixing members 25, thereby attaching the stopper 28 to both sides of the flat display device.

(First Variant of Second Embodiment)

Figure 22:
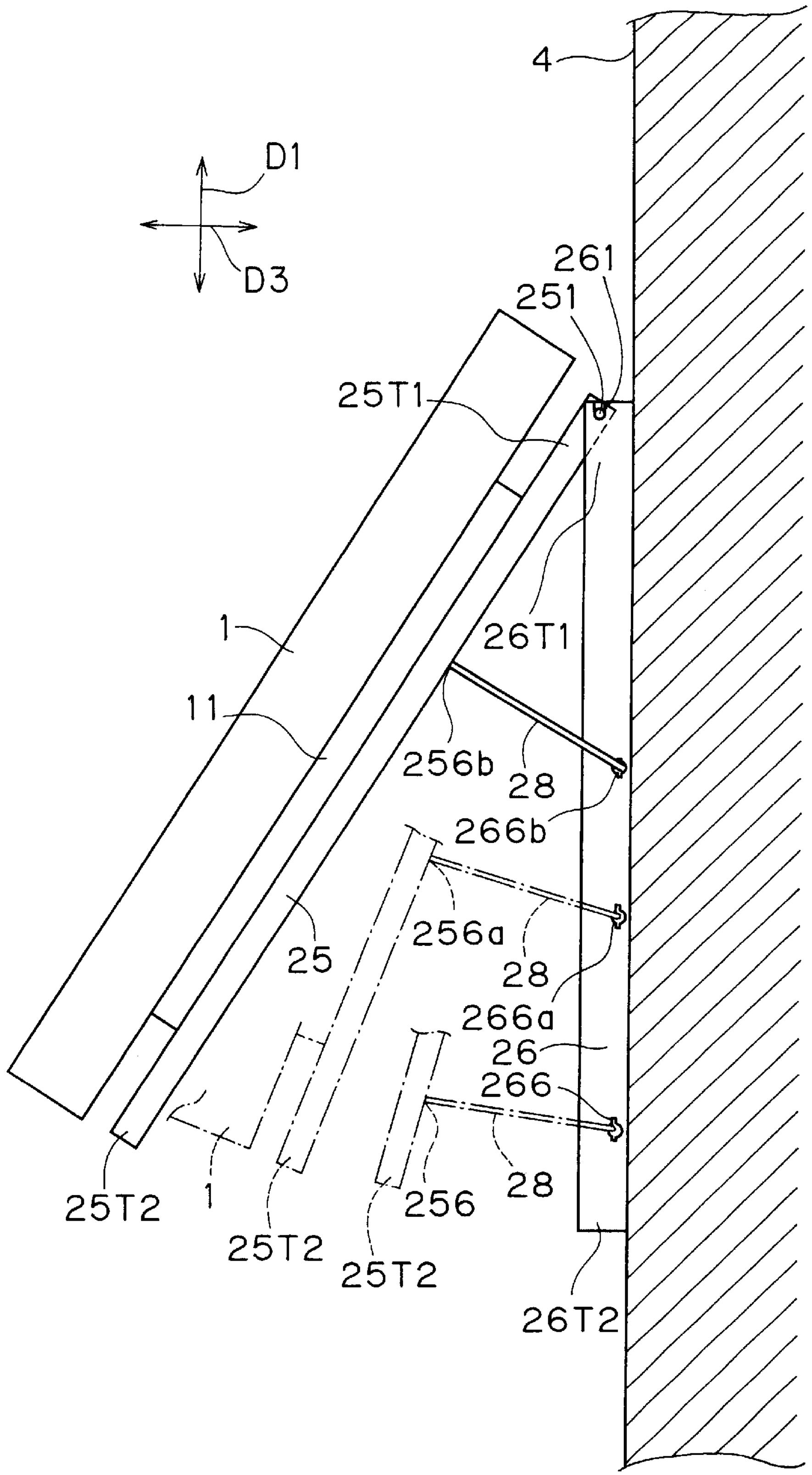
FIG. 22 is a side view showing a structure of a flat display device and an installation configuration thereof according to a first variant of the second embodiment.

In a first variant, as shown in FIG. 22, a plurality of stopper attaching holes 266, 266*a* and 266*b* are formed in a first direction D1 in a plate-shaped portion 26*c* on one of first and second installation face side fixing members 26A and 26B or both of them, and stopper receiving holes 256, 256*a* and 256*b* are correspondingly formed in positions corresponding to the stopper attaching holes 266, 266*a* and 266*b* in a base member 25*a* of one of first and second body side fixing members 25A and 25B or both of them. In this case, the stopper attaching holes 266, 266*a* and 266*b* and the stopper receiving holes 256, 256*a* and 256*b* are properly determined from a plurality of combinations. The stopper 28 is inserted into the selected stopper attaching hole and the stopper receiving hole. Consequently, a position where the stopper 28 is to be provided, that is, an inclination angle (a tilt angle) of the display unit 1 or the flat display panel 1*a* (see FIG. 1) can be selected and changed optionally, the above-mentioned workability such as maintenance or the like can be more enhanced, and it is possible to cope with the work flexibly. As a matter of course, a method for selecting a tilt angle is not restricted to a configuration shown in FIG. 22. For example, it is also possible to select the stopper attaching hole 266 and the stopper receiving hole 256*a*, thereby setting the tilt angle by using a stopper having such a dimension as to support the body side fixing member 25 (therefore, the dimension is not restricted to a length of the stopper 28).

(Second Variant of Second Embodiment)

Figure 23:
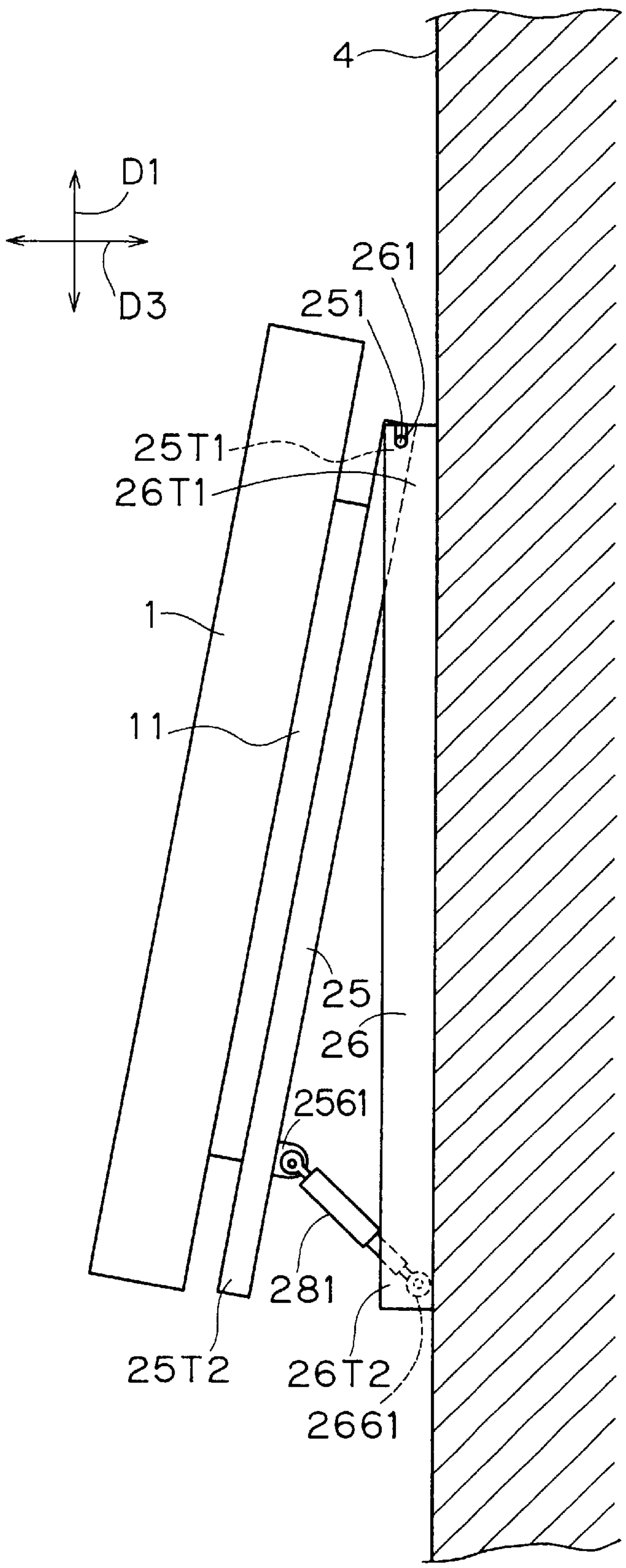
FIG. 23 is a side view showing a structure of a flat display device and an installation configuration thereof according to a second variant of the second embodiment.

As shown in FIG. 23, furthermore, it is also possible to implement the tilt mechanism of the flat display device by using a damper 281. More specifically, as shown in FIG. 23, one of ends of the damper 281 is attached to a damper attaching portion 2561 formed on the lower side end 25T2 side of the body side fixing member 25 in a rotatable configuration around the damper attaching portion 2561, and the other end of the damper 281 is attached to a damper attaching portion 2661 formed on the lower side end 26T2 side of the installation face side fixing member 26 in a rotatable configuration around the damper attaching portion 2661. Consequently, the same effects as in the above-mentioned (g) and (h) can be obtained. As a matter of course, the damper 281 can also be attached to ends 25T2 and 26T2 of a second body side fixing member 25B and a second installation face side fixing member 26B in addition to ends of a first body side fixing member 25A and a first installation face side fixing member 26A. Also in this case, the same effects can be obtained.

(Third Variant of Second Embodiment)

Figure 24:
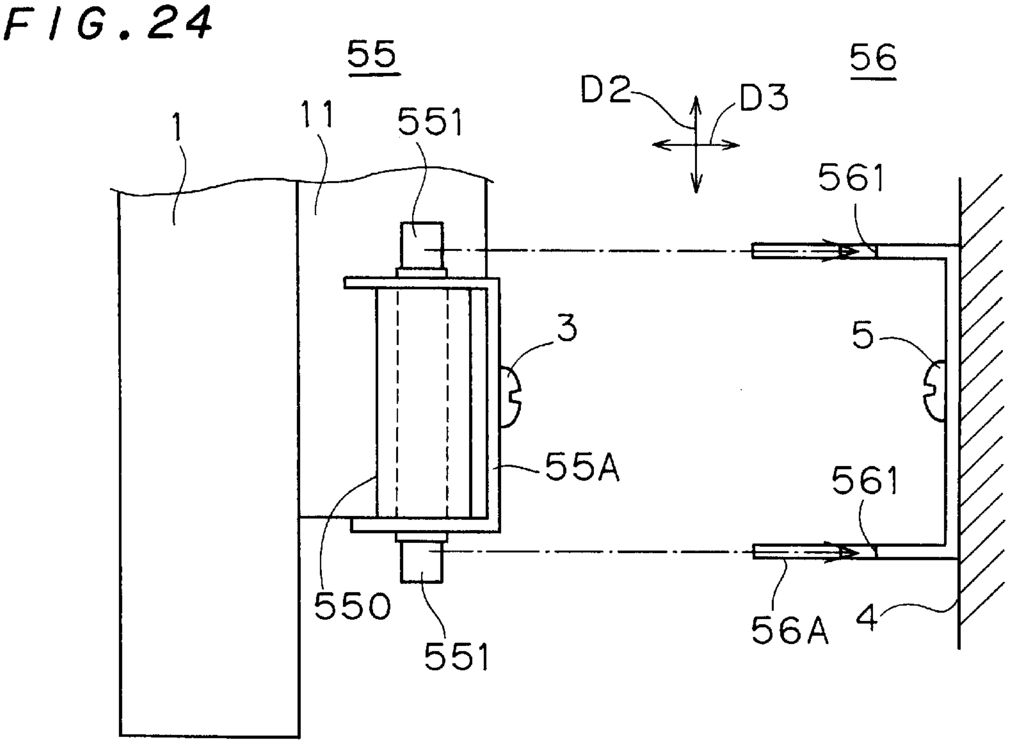
FIG. 24 is a top view showing a structure of a flat display device and an assembly configuration thereof according to a third variant of the second embodiment.
Figure 25:
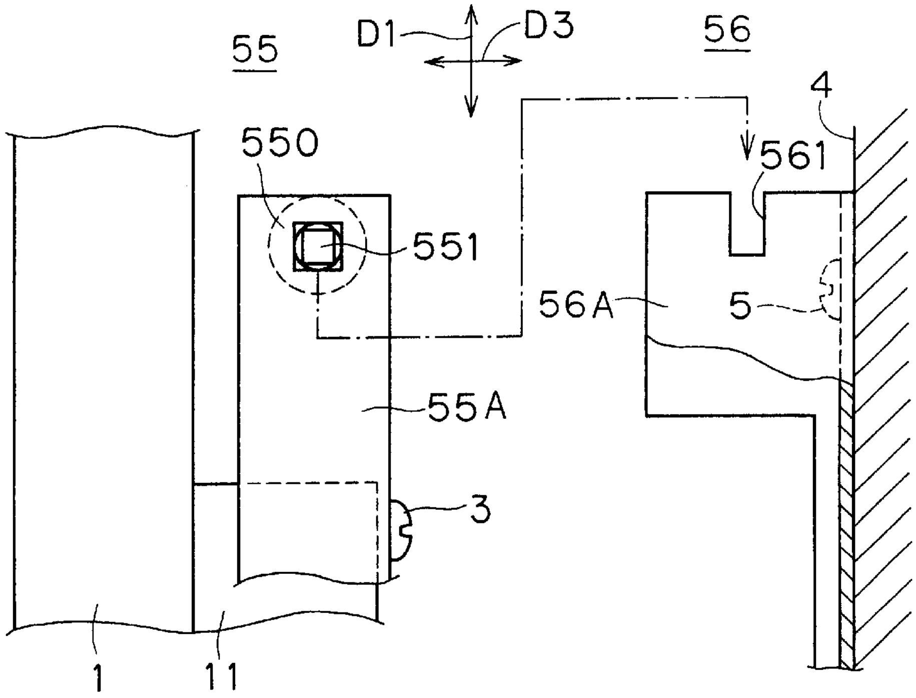
FIG. 25 is a side view showing the structure of the flat display device and the assembly configuration thereof according to the third variant of the second embodiment.

As shown in FIGS. 24 and 25 which are enlarged views showing upper side ends (corresponding to the upper ends 25T1 and 26T1 shown in FIG. 21), moreover, a rotary damper 550 is provided on the upper side ends of a body side fixing member 55 (corresponding to the body side fixing member 25) and an installation face side fixing member 56 (corresponding to the installation face side fixing member 26) in the flat display device according to the first embodiment. Thus, the tilt mechanism of the flat display device can be implemented. More specifically, as shown in FIGS. 24 and 25, the rotary damper is inserted and fixed between the facing plate-shaped portions such that a rotary shaft 551 is projected from the facing plate-shaped portions (corresponding to the plate-shaped portions **25*c* and 25*e* in FIG. 11) in a second direction D2 of a first body side fixing member 55A. By fitting the rotary shaft 551 in a cut portion 561 which is formed on the upper side end (corresponding to the upper side end 26T1 in FIG. 10) of a first installation face side fixing member 56A and is square-shaped as seen in a first direction D1, the same effects as in the above-mentioned (g) and (h) can be obtained. As a matter of course, the rotary damper 550 may be provided on the second body side fixing member (corresponding to the second body side fixing member 25B in FIG. 9) and the second installation face side fixing member (corresponding to the second installation face side fixing member 26B in FIG. 9**), and furthermore, may be provided on both the first and second body side fixing members and the first and second installation face side fixing members.

(Fourth Variant of Second Embodiment)

Figure 26:
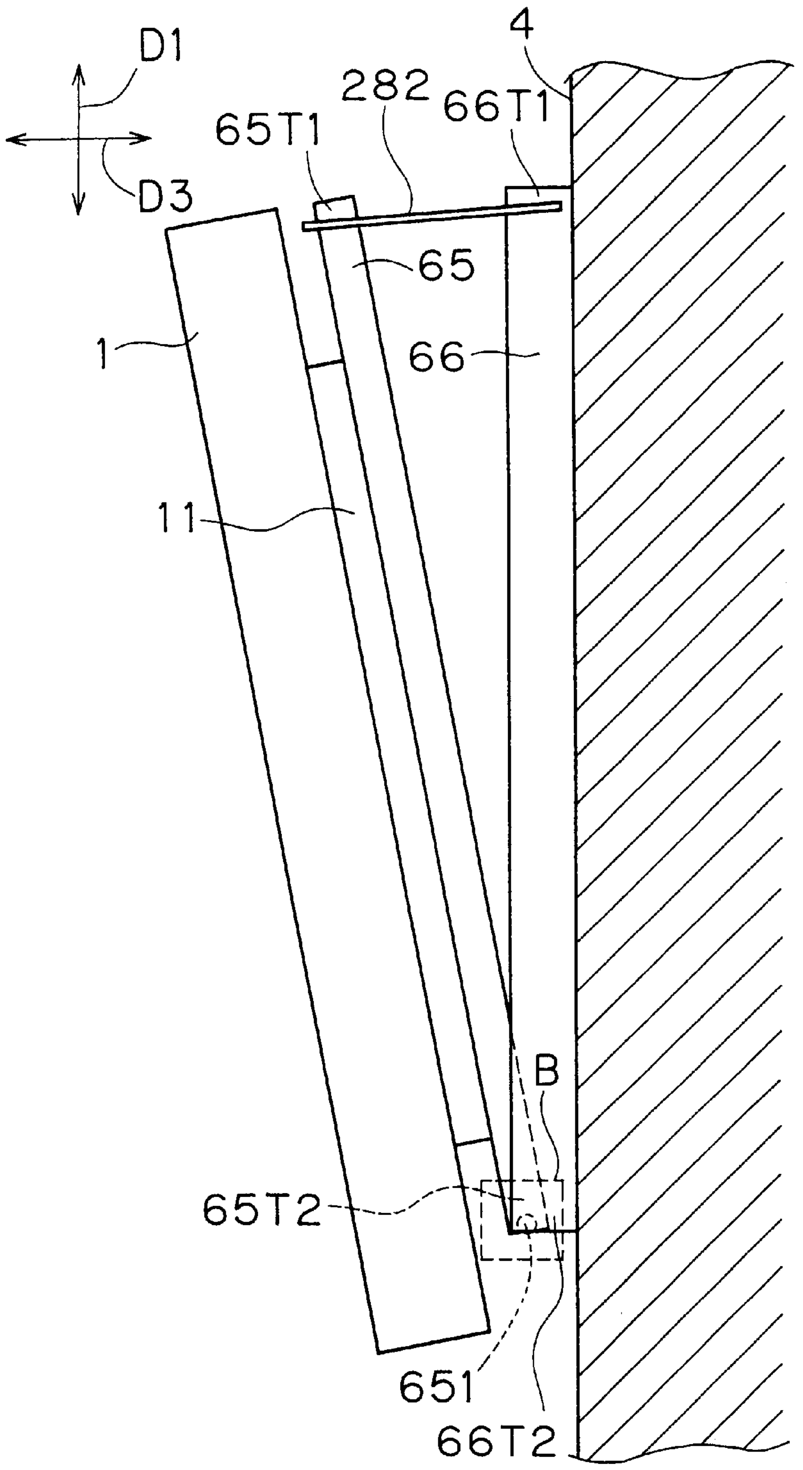
FIG. 26 is a top view showing a structure of a flat display device and an assembly configuration thereof according to a fourth variant of the second embodiment.

As shown in FIG. 26, next, description will be given to a structure of a flat display device capable of tilting a display unit 1 toward a ground and holding such a state.

As shown in FIG. 26, in a flat display device according to a fourth variant, a body side fixing member 65 and an installation face side fixing member 66 are based on the structures of the body side fixing member 25 and the installation face side fixing member 26 shown in FIG. 21, and are different from the members 25 and 26 in respect of the following structure. More specifically, a hole corresponding to the stopper attaching hole 266 shown in FIGS. 19 and 20 is formed on an upper side end (a fourth end) 66T1 of the installation face side fixing member 66, one of ends of a stopper 282 capable of fulfilling the same function as in the stopper 28 shown in FIGS. 19 and 20 is inserted into the hole, and the other end of the stopper 282 is supported on an upper side end (a second end) 65T1 of the body side fixing member 65.

Furthermore, the body side fixing member 65 and the installation face side fixing member 66 are mutually supported on lower side ends (first and third ends) 65T2 and 66T2, respectively. Such support portions constitute a central axis of rotation of the display unit 1. In this respect, description will be given with reference to FIG. 27 which is an enlarged perspective view showing a portion B enclosed by a broken line in FIG. 26. Although FIG. 27 shows only a first body side fixing member 65A and a first installation face side fixing member 66A, a second body side fixing member and a second installation face side fixing member similarly have a structure or a mechanism which will be described below.

Figure 27:
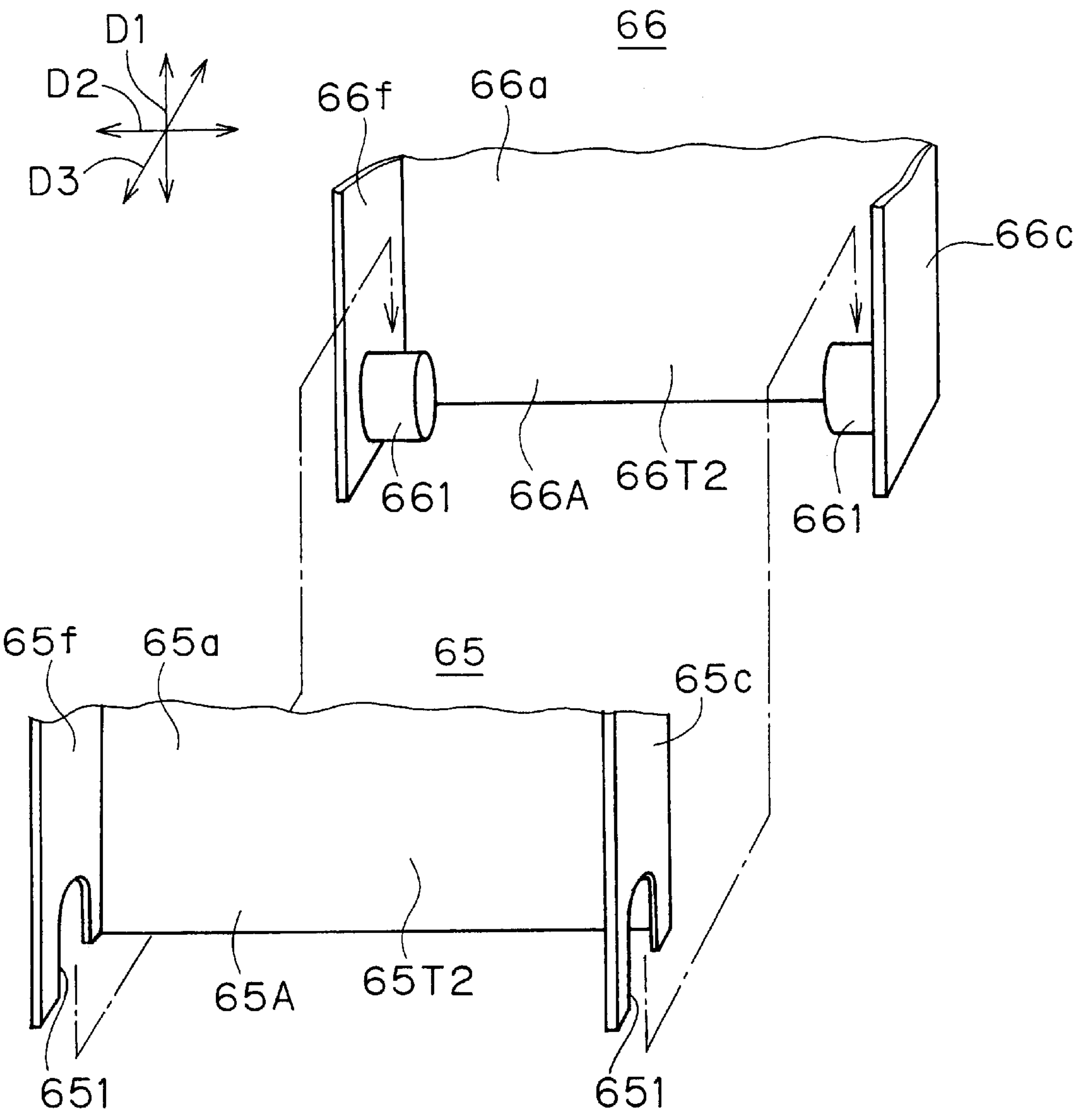
FIG. 27 is an enlarged perspective view showing structures of a body side fixing member and an installation face side fixing member and an assembly configuration thereof according to the fourth variant of the second embodiment.

As shown in FIG. 27, a projection 661 corresponding to the above-mentioned projection 251 is formed on both facing surfaces (back faces) of plate-shaped portions **66*c* and 66*f* of the first installation face side fixing member 66A in such a manner that central axes are coincident with each other. Furthermore, a "U"-shaped cut portion 651 capable of inserting the projection 661 with a play therein and corresponding to the above-mentioned cut portion 261 is formed in a first direction D1 in positions facing each other on a part forming one block of a lower side end 65T2 in plate-shaped portions 65*c* and 65*f* of the first body side fixing member 65A. As shown in FIGS. 26 and 27, such a projection 661 is inserted with a play in the cut portion 651 so that the both portions 661 and 651** are supported each other.

In the flat display device according to the fourth variant, consequently, the body side fixing member 65 is rotatable around the central axis of the projection 661. In addition, a predetermined tilt angle can be held by a stopper 282 of the upper side ends 65T1 ant 66T1 of the body side fixing member 65 and the installation face side fixing member 66. Accordingly, the same effects as in the above-mentioned (g) and (h) can be obtained.

It is also possible to further modify the present variant shown in FIG. 26 such that the upper side ends of the body side fixing member 65 and the installation face side fixing member 66 are fixed to each other with a screw or the like as in the first embodiment without a tilt function. In this case, the effects (a) to (f) in the first embodiment can exactly be obtained.

Third Embodiment

Next, a structure of a flat display device according to a third embodiment will be described with reference to FIG. 28. In the following, the same components as in the flat display device according to the first or second embodiment described above have the same reference numerals and their description will be omitted.

Figure 28:
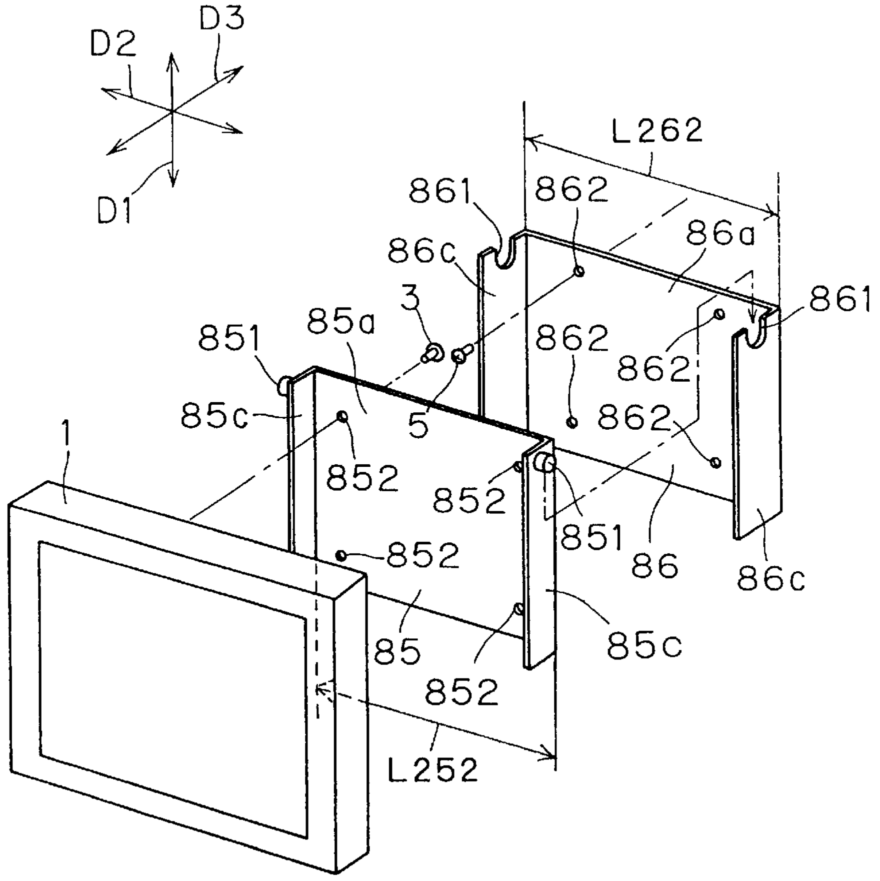
FIG. 28 is a perspective view showing a structure of a flat display device and an assembly configuration thereof according to a third embodiment.

As shown in FIG. 28, a body side fixing member 85 of the flat display device according to the third embodiment is constituted by one plate-shaped member having both ends bent into an "L" shape, and has a plate-shaped portion **85*a* and a plate-shaped portion 85*c* extended in a third direction D3 from each of two sides in a first direction D1 of the plate-shaped portion 85*a***.

The plate-shaped portions **85*a* and 85*c* have main surfaces and sections which are rectangular. A length in the first direction D1 of the plate-shaped portion 85*a* is equal to the length L251 in the first direction D1 of the body side fixing member 25 or the plate-shaped portion 25*a* shown in FIGS. 3 and 4, and, in more detail, is set equal to or greater than the length L111 in the first direction D1 of the projected portion 11 of the display unit 1 and is set smaller than the length L11 in the first direction D1 of the display unit 1. On the other hand, a length in a second direction D2 of the plate-shaped portion 85*a* is set equal to the length L252 in the second direction D2 of the body side fixing member 25 shown in FIGS. 3 and 4, and, in more detail, is set equal to or greater than the length L112 in the second direction D2 of the projected portion 11 of the display unit 1 and is set smaller than the length L12 in the second direction D2 of the display unit 1. Moreover, a length in a third direction D3 of the plate-shaped portion 85*c* is set equal to or smaller than the height H11 of the projected portion 11 (see FIGS. 3 and 4**).

Furthermore, the same projections 851 as the projections 251 (see FIGS. 3 and 4) are extended in opposite directions to each other on upper side ends (corresponding to the upper side ends 25T1 shown in FIGS. 3 and 4) in the first direction D1 of both plate-shaped portions **85*c***.

The body side fixing member 85 is provided for the display unit 1 such that the upper face 113 of the projected portion 11 of the display unit 1 shown in FIGS. 3 and 4 and a back face of the plate-shaped portion **85*a* come in contact with each other, and is screwed and fixed to the projected portion 11 of the display unit 1 through a hole 852 formed in a predetermined position of the plate-shaped portion 85*a***.

On the other hand, as shown in FIG. 28, an installation face side fixing member 86 of the flat display device is also formed of one plate-shaped member having both ends bent into an "L" shape, and furthermore, has almost the same shape and dimension as in the body side fixing member 85. The body side fixing member 85 can be housed in a "U"-shape of the installation face side fixing member 86. Therefore, a length L262 in the second direction D2 of a plate-shaped portion 86*a* of the installation face side fixing member 86 is set equal to or greater than the length L252 in the second direction D2 of the plate-shaped portion 85*a*, and is set smaller than the length L12 in the second direction D2 of the display unit 1 (see FIG. 3 or FIG. 4).

In particular, the same cut portion 261 as the cut portion 261 (see FIG. 7) is formed in the first direction D1 on upper side ends (see FIG. 7) in the first direction D1 of both plate-shaped portions 86*c*.

The installation face side fixing member 86 is screwed and fixed into a predetermined position of the installation face 4 (see FIG. 2) through a hole 862 formed in a predetermined position of the plate-shaped portion 86*a*.

As shown in FIG. 28, the projection 851 is inserted into a cut portion 861. Consequently, the projection 851 and the cut portion 861 are supported each other so that the display unit 1 is provided on the installation face 4.

Referring to a configuration (mechanism) in which the both fixing members 85 and 86 are fastened and fixed to each other on lower side ends (corresponding to the lower side ends 25T2 and 26T2 in FIG. 16) of the members 85 and 86, the description of each of the first embodiment and the first and second variants thereof is only cited and their detailed description is omitted, and the configuration is not shown in FIG. 28. In the flat display device, moreover, the manner of "insertion" of the projection 851 into the cut portion 861 in the body side fixing member 85 and the installation face side fixing member 86 may take any of the case ① where the insertion is performed without a play between the both portions 851 and 861 ("fitting") and the case ② where the insertion is performed with a play between the both portions 851 and 861 ("insertion with a play").

As seen from such an installation configuration, a structure of each of the body side fixing member 85 and the installation face side fixing member 86 can be regarded as follows. More specifically, in the case where the plate-shaped portion 85*a* corresponds to the plate-shaped portion 25*a* (see FIGS. 3 and 4), it can be understood that the body side fixing member 85 corresponds to the first or second body side fixing member 25A or 25B (see FIGS. 3 and 4). Similarly, in the case where the plate-shaped portion 86*a* corresponds to the plate-shaped portion 26*a* (see FIG. 7), it can be understood that the installation face side fixing member 86 corresponds to the first or second installation face side fixing member 26A or 26B (see FIG. 7).

On the other hand, it can be understood that the body side fixing member 85 has a structure in which both of the first and second body side fixing members 25A and 25B shown in FIGS. 3 and 4 are connected to each other by means of another plate-shaped member and the plate-shaped portions 25*e* and 25*f* are removed. Similarly, it can be understood that the installation face side fixing member 86 has a structure in which both of the first and second body side fixing members 26A and 26B shown in FIG. 7 are connected to each other by means of another plate-shaped member in place of the positioning member 27 and the plate-shaped portions 26*e*, 26*f* and 26*g* are removed.

In any of the above-mentioned configurations, accordingly, the body side fixing member 85 can produce the same effects as the effects obtained by the above-mentioned body side fixing member 25, and the installation face side fixing member 86 can produce the same effects as the effects obtained by the above-mentioned installation face side fixing member 26.

According to the flat display device comprising the both members 85 and 86 which are fastened and fixed to each other on the lower side ends thereof, therefore, the above-mentioned effects (a) to (f) can be obtained. Referring to a reduction in the weight of the flat display device (see the above-mentioned effect (c)), the flat display device according to each of the first embodiment and the first and second variants thereof has a superiority due to the weights of the body side fixing member and the installation face side fixing member. Referring to the workability of insertion of the projection 851 into the cut portion 861, the flat display device according to the third embodiment has a superiority because the numbers of the projections 851 and the cut portions 861 are smaller.

Furthermore, when the tilt mechanism according to each of the second embodiment and the first to fourth variants thereof described above is applied to the flat display device, the above-mentioned effects (g) and (h) can be obtained.

Since both the body side fixing members 25 and 85 or both the installation face side fixing members 26 and 86 have the same substantial shapes respectively, the body side fixing member 25 and the installation face side fixing member 86 can also be combined for use, for example.

Appendix

By attaching one body side fixing member 25 having, as both side plate portions, side plate portions comprising the plate-shaped portions 25*e*, 25*g* and 25*f* shown in FIG. 3 to the central portion of the upper face 113 of the projected portion 11 of the display unit 1, employing, as the installation face side fixing member 26, a member comprising only the first installation face side fixing member 26A or the second installation face side fixing member 26B shown in FIG. 7 and obtained by replacing the plate-shaped portion 26*c* with a side plate portion including the plate-shaped portions 26*e*, 26*g* and 26*f* corresponding to the structure of the body side fixing member 25, and inserting the two projections 251 of the body side fixing member 25 having the above-mentioned structure into the two cut portions 261 of the installation face side fixing member 26, the display unit 1 can also be provided on the installation face 4. In this case, the dimensions L252 and L262 of the members 25 and 26 are smaller than the dimension L112 of the projected portion 11. Accordingly, it is required that the dimensions L252 and L262 should be smaller than the dimension L12.

While the present invention has been described in detail, the above description is illustrative in all aspects and the present invention is not restricted thereto. It is understood that numerous variants which have not been illustrated can be supposed without departing from the scope of the invention.

What is claimed is:

1. A flat display device comprising:

a display unit provided with a projected portion on a predetermined region of a rear face of said display unit, said projected portion having a first side face extended in a first direction, a second side face extended in a second direction orthogonal to said first direction and an upper face defined by said first and second side faces;

a body side fixing member fixed onto said upper face of said projected portion, having a first length in said first direction which is greater than a length of said first side face of said projected portion and is smaller than a length in said first direction of said display unit and a second length in said second direction which is smaller than a length in said second direction of said display unit; and an installation face side fixing member having a third length in said first direction which is smaller than said length in said first direction of said display unit and is greater than said length of said first side face of said projected portion and a fourth length in said second direction which is smaller than said length in said second direction of said display unit, said installation face side fixing member including:

a fixing portion for attaching said installation face side fixing member onto an installation face on which said display unit is to be installed, said body side fixing member including:

a first support portion provided on a first end corresponding to one of both ends projected from said upper face of said projected portion, said installation face side fixing member including:

a second support portion provided on an end facing said first end, said first support portion and said second support portion being supported each other, and said body side fixing member and said installation face side fixing member being fixed to said upper face of said projected portion and said installation face, respectively, so as not to protrude from an outer frame of said display unit as seen from a front face side of said display unit.

2. The flat display device according to claim 1, wherein said first and second support portions have said first support portion rotatably supported at a rotating angle in a plane defined by a third direction orthogonal to said first and second directions and said first direction.

3. The flat display device according to claim 2, wherein a mechanism to which a member for supporting said first support portion can be attached such that said body side fixing member is tilted at a predetermined angle with respect to said installation face side fixing member is provided on both a second end corresponding to the other end of said both ends of said body side fixing member and an end of said installation face side fixing member facing said second end.

4. The flat display device according to claim 2, wherein a rotary damper having a rotary shaft constituting said first support portion is provided on said first end of said body side fixing member, and said rotary shaft and said second support portion are supported each other.

5. The flat display device according to claim 1, wherein said first support portion includes:

first and second projections extended in directions opposite to each other from said first end in said second direction, said second support portion includes:

first and second cut portions formed to face each other on a third end facing said first end in said first direction, said first projection is inserted in said first cut portion, and said second projection is inserted in said second cut portion.

6. The flat display device according to claim 5, wherein said first and second projections are inserted with a play in said first and second cut portions, respectively.

7. The flat display device according to claim 6, wherein said body side fixing member further includes:

a first hole portion provided on a second end which is the other end of said both ends, and said installation face side fixing member further includes:

a second hole portion provided on a fourth end facing said second end, said first and second hole portions being formed in positions where corresponding tips of a bar processed to have predetermined shapes for tilting said body side fixing member at a predetermined angle with respect to said installation face side fixing member can be inserted, respectively.

8. The flat display device according to claim 1, wherein said body side fixing member includes:

a first fixing portion provided in said second end corresponding to the other end of said both ends, and said installation face side fixing member includes:

a second fixing portion provided in an end facing said second end corresponding to a position where said first fixing portion is to be provided, said first and second fixing portions being fixed to each other through a fixing said first and second fixing portions being fixed to each other through a fixing member.

9. The flat display device according to claim 8, wherein said fixing member is a screw, said first and second fixing portions are fastened to each other with said screw, and said screw does not protrude from said outer frame of said display unit.

10. The flat display device according to claim 9, wherein said first fixing portion includes a first plate-shaped portion tilted at a predetermined angle with respect to said installation face, and said second fixing portion includes a second plate-shaped portion tilted at said predetermined angle with respect to said installation face, said first and second plate-shaped portions being formed in positions where they are in surface-to-surface contact with each other and being fastened to each other with said screw.

11. The flat display device according to claim 8, wherein said body side fixing member further includes:

a first plate-shaped portion which is parallel with a plane defined by said first direction and a third direction orthogonal to said first and second directions, an end of said first plate-shaped portion forming a part of said second end corresponding to said first fixing portion, and said installation face side fixing member further includes;

a second plate-shaped portion which is parallel with said first plate-shaped portion, an end of said second plate-shaped portion forming a part of said end facing said second end corresponding to said second fixing portion, said first and second plate-shaped portions being formed in positions where they are in surface-to-surface contact with each other.

12. The flat display device according to claim 1, wherein a space between one of side faces which is perpendicular to said first direction of said display unit and one of said first side faces of said projected portion on a side where said first end and a third end of said installation face side fixing member facing said first end are projected is greater than a length in said first direction of each of said first end and said third end, and a space between the other side face which is perpendicular to said first direction of said display unit and the other face of said first side faces of said projected portion on a side where a second end corresponding to the other end of said both ends of said body side fixing member and a fourth end of said installation face side fixing member facing said second end are projected is greater than a length in said first direction of each of said second end and said fourth end.

13. The flat display device according to claim 1, wherein said body side fixing member is constituted by first and second body side fixing members having shapes symmetrical with each other, said first body side fixing member being fixed to an end of said upper face along one side face side in said first side face of said projected portion, and said second body side fixing member being fixed to an end of said upper face along the other side face side in said first side face of said projected portion.

14. The flat display device according to claim 13, wherein said first body side fixing member further includes:

a first plate-shaped portion which is parallel with one of said side faces and overlaps said side face, and said second body side fixing member further includes:

a second plate-shaped portion which is parallel with said other side face and overlaps said other side face, a length in said third direction of each of said first and second plate-shaped portions being set based on a distance between said upper face of said projected portion and said rear face of said display unit.

15. The flat display device according to claim 14, wherein said first installation face side fixing member further includes:

a third plate-shaped portion which is parallel with one of said side faces and overlaps said side face and said first plate-shaped portion, and said second installation face side fixing member further includes:

a fourth plate-shaped portion which is parallel with said other side face and overlaps said other side face and said second plate-shaped portion, a length in said third direction of each of said third and fourth plate-shaped portions being set based on said distance between said upper face of said projected portion and said rear face of said display unit.

16. The flat display device according to claim 1, wherein said installation face side fixing member includes:

said first and second installation face side fixing members which are parallel with each other, are provided in said first direction and have shapes symmetrical with each other; and said first and second positioning members which are connected to both of said first and second installation face side fixing members and are provided in said second direction.

17. A fixing member for a display unit for installing, on an installation face, a display unit provided with a projected portion on a predetermined region of a rear face of said display unit, said projected portion having a first side face extended in a first direction, a second side face extended in a second direction orthogonal to said first direction and an upper face defined by said first and second side faces, wherein a first length in said first direction is greater than a length of said first side face of said projected portion and is smaller than a length in said first direction of said display unit and a second length in said second direction is smaller than a length in said second direction of said display unit, said fixing member can be fixed onto said upper face of said projected portion such that it does not protrude from an outer frame of said display unit as seen from a front face side of said display unit, and a projection extended in said second direction is provided on one of both ends projected from said upper face of said projected portion.

18. A fixing member for a display unit for installing, on an installation face, a display unit provided with a projected portion on a predetermined region of a rear face of said display unit, said projected portion having a first side face extended in a first direction, a second side face extended in a second direction orthogonal to said first direction and an upper face defined by said first and second side faces, said fixing member having a length in said first direction which is smaller than said length in said first direction of said display unit and is greater than said length of said first side face of said projected portion and a fourth length in said second direction which is smaller than said length in said second direction of said display unit, said fixing member comprising a fixing portion for attaching said fixing member onto an installation face where said display unit is to be installed such that it does not protrude from an outer frame of said display unit as seen from a front face side of said display unit, and a cut portion is formed in said first direction on one of both ends in said first direction.

* * * * *